United States Patent
Asano et al.

(10) Patent No.: US 12,412,305 B2
(45) Date of Patent: Sep. 9, 2025

(54) INFORMATION PROCESSING APPARATUS, INFORMATION PROCESSING METHOD, IMAGE CAPTURING APPARATUS, STORAGE MEDIUM FOR CORRECTING LENS DISTORTION ABERRATIONS

(71) Applicant: CANON KABUSHIKI KAISHA, Tokyo (JP)

(72) Inventors: Motoyuki Asano, Tokyo (JP); Makoto Yokozeki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 18/154,608

(22) Filed: Jan. 13, 2023

(65) Prior Publication Data

US 2023/0230282 A1    Jul. 20, 2023

(30) Foreign Application Priority Data

Jan. 20, 2022 (JP) ................. 2022-007275

(51) Int. Cl.
*G06T 7/80* (2017.01)
*G06T 3/40* (2024.01)
(Continued)

(52) U.S. Cl.
CPC .......... *G06T 7/80* (2017.01); *G06T 3/40* (2013.01); *G06T 5/50* (2013.01); *G06T 5/80* (2024.01);
(Continued)

(58) Field of Classification Search
None
See application file for complete search history.

(56) References Cited

U.S. PATENT DOCUMENTS 8,928,757 B2    1/2015  Maekawa et al.
9,282,326 B2 *  3/2016  Olson ................. H04N 17/002
(Continued)

FOREIGN PATENT DOCUMENTS

JP    4270949 B2    6/2009
JP    2013219439 A  10/2013
(Continued)

OTHER PUBLICATIONS

"Camera Lens Calibration for Production"; Nov. 27, 2021; XP093057394; Retrieved from the Internet: URL: https://web.archive.org/web/20211127122639/https://docs.unrealengine.com/4.27/en-US/WorkingWith Media/IntegratingMedia/InCameraVFX/CameraCalibrationForProduction/; (retrieved on Jun. 23, 2023); pp. 1-27.

(Continued)

*Primary Examiner* — Quan Pham
(74) *Attorney, Agent, or Firm* — Canon U.S.A., Inc. IP Division

(57) ABSTRACT

An information processing apparatus comprises a first acquisition unit that acquires a captured image obtained by capturing an image of a chart for calibration, a second acquisition unit that acquires a reference image which is an image of the chart that serves as a reference, a third acquisition unit that acquires information on distortion aberration of a lens used to capture the captured image, a first generation unit that generates a pseudo image which is an image obtained by reflecting the distortion aberration in the reference image, based on the reference image and the information on distortion aberration, and a second generation unit that generates a composite image obtained by compositing the captured image and the pseudo image.

17 Claims, 24 Drawing Sheets

(51) Int. Cl.
  *G06T 5/50*   (2006.01)
  *G06T 5/80*   (2024.01)
  *G06V 10/56*  (2022.01)
  *G06V 10/74*  (2022.01)
  *H04N 23/60*  (2023.01)
  *H04N 23/68*  (2023.01)
  *H04N 23/81*  (2023.01)

(52) U.S. Cl.
  CPC ............ *G06V 10/56* (2022.01); *G06V 10/761* (2022.01); *H04N 23/64* (2023.01); *H04N 23/687* (2023.01); *H04N 23/81* (2023.01); *G06T 2207/10024* (2013.01); *G06T 2207/20221* (2013.01)

(56) References Cited

U.S. PATENT DOCUMENTS

| | | |
|---|---|---|
| 11,232,593 B2 | 1/2022 | Yamashita et al. |
| 2013/0215280 A1 | 8/2013 | Maekawa et al. |
| 2013/0265442 A1 | 10/2013 | Maekawa et al. |
| 2014/0232879 A1* | 8/2014 | Gottwals .............. H04N 17/002 348/188 |
| 2018/0357509 A1* | 12/2018 | Dlugosz .................... G06T 7/80 |
| 2020/0027242 A1 | 1/2020 | Koyama et al. |
| 2020/0273205 A1 | 8/2020 | Yamashita et al. |

FOREIGN PATENT DOCUMENTS

| | | |
|---|---|---|
| JP | 2014155086 A | 8/2014 |
| JP | 2017138287 A | 8/2017 |
| JP | 2018202104 A | 12/2018 |
| JP | 2021044731 A | 3/2021 |
| JP | 6859442 B2 | 4/2021 |

OTHER PUBLICATIONS

Extended European Search Report for Application No. 22217267.8, European Patent Office, Jul. 4, 2023.

* cited by examiner

STATE THAT CENTER POSITIONS OF CAPTURED IMAGE AND REFERENCE IMAGE ARE ALIGNED

STATE THAT CENTER POSITIONS AND ANGLE OF VIEW OF CAPTURED IMAGE AND REFERENCE IMAGE ARE ALIGNED

DESCRIPTION OF IDENTIFICATION OF
EACH GRID AND FOUR CORNERS OF GRID

DESCRIPTION OF COORDINATES OF FOUR CORNERS OF GRID PORTIONS

DESCRIPTION OF RELATIONSHIP BETWEEN CAPTURED IMAGE
AND REFERENCE IMAGE FOR ESTIMATING DISTORTION AMOUNT

CAPTURED IMAGE
REFERENCE IMAGE

STATE THAT CENTER POSITIONS OF CAPTURED IMAGE
AND REFERENCE IMAGE ARE ALIGNED

STATE THAT POSITIONS OF CAPTURED IMAGE AND REFERENCE IMAGE ARE OUT OF ALIGNMENT 712

POSITION ALIGNMENT COMPLETION STATE

CALCULATION OF DEGREE OF DEVIATION OF ONE GRID SECTION $$\vec{Vdd}_{g0} = \vec{V}_{i0j0} + \vec{V}_{i1j0} + \vec{V}_{i0j1} + \vec{V}_{i1j1}$$

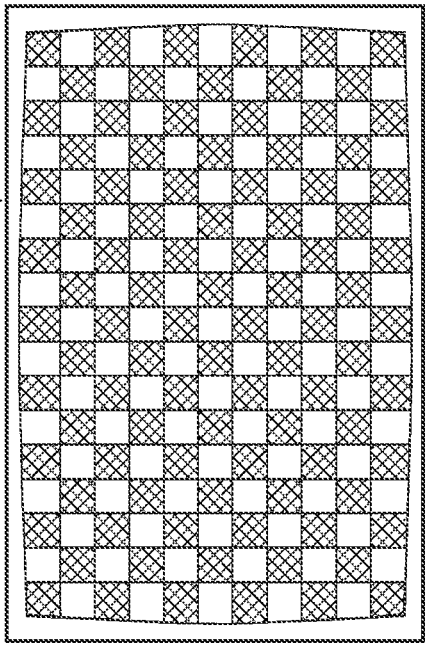

FIG. 9B STATE THAT CAPTURED IMAGE AND REFERENCE IMAGE ARE MATCHED (WITHOUT DISTORTION)

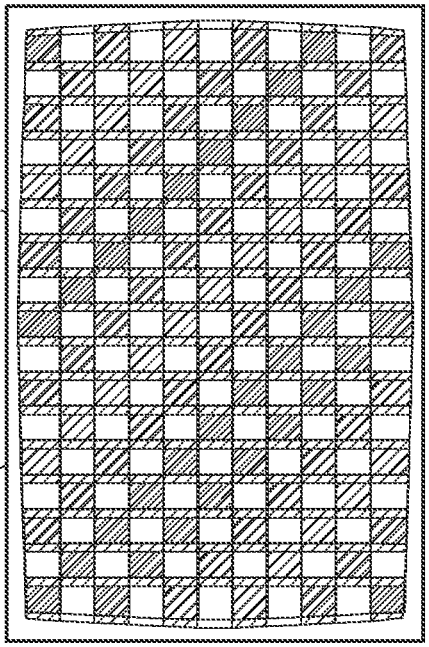

FIG. 9D STATE THAT REFERENCE IMAGE IS OUT OF ALIGNMENT WITH CAPTURED IMAGE TO LOWER SIDE (WITHOUT DISTORTION)

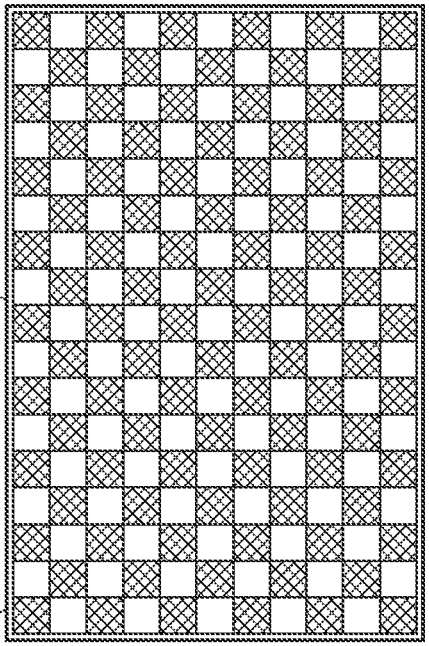

FIG. 9C STATE THAT CAPTURED IMAGE AND PSEUDO IMAGE ARE MATCHED (WITH DISTORTION)

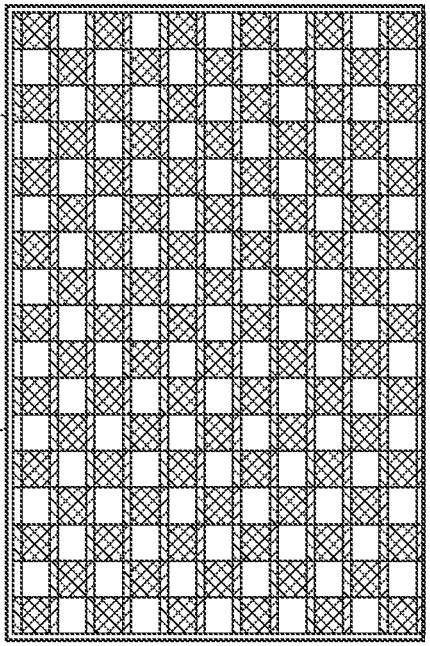

FIG. 9E STATE THAT PSEUDO IMAGE IS OUT OF ALIGNMENT WITH CAPTURED IMAGE TO RIGHT SIDE (WITH DISTORTION)

EXAMPLE OF MESSAGE DISPLAY

MOVE CAMERA UPWARD
1001

EXAMPLE OF GRAPHIC (ICON) DISPLAY

1002

EXAMPLE OF GUIDES (BAR GAUGES) DISPLAY 1003
1005
1006
1004

INFORMATION PROCESSING APPARATUS, INFORMATION PROCESSING METHOD, IMAGE CAPTURING APPARATUS, STORAGE MEDIUM FOR CORRECTING LENS DISTORTION ABERRATIONS

BACKGROUND

Field of the Disclosure

The present disclosure relates to an information processing technology for acquiring information for positionally aligning a camera and a chart.

Description of the Related Art

In recent years, a technology called Visual Effects (VFX) has been attracting attention in the field of image production. VFX is a technology for realizing unrealistic screen effects (visual effects) and is realized by compositing computer graphics (CG) and live-action images. Here, depending on the image capturing lens, when compositing CG and a live-action image without taking account of the amount of distortion of the lens, a difference occurs between the live-action image with lens distortion aberration and the CG image without lens distortion aberration. Thus, in post-production, it is necessary to initially correct the live-action image for lens distortion aberration, and composite the corrected live-action image with the CG image, and to then perform distortion processing on the composited image.

Distortion aberration correction according to the image height becomes possible by acquiring distortion information as metadata from the camera (lens). However, depending on the image capturing lens, it may not be possible to acquire distortion information. To calculate the lens distortion amount in the case where distortion information cannot be acquired, generally, a grid-like calibration chart in which black and white grid portions are arrayed repetitively is captured during live-action capture, and subsequently, in post-production, the lens distortion amount is calculated from the captured image using a dedicated application. With this method that involves capturing an image of a calibration chart, position alignment (position, attitude) of the chart and the camera needs to be accurately performed. The current situation with image capture is that position alignment of the chart and the camera is performed visually by the user, and thus accurate alignment is not achieved.

Japanese Patent Laid-Open No. 2014-155086 discloses a method in which a reference image serving as a reference for adjusting the angle of view is stored in an angle-of-view adjustment apparatus (camera), and a moving image of the camera that has not undergone angle-of-view adjustment is composited with the reference image and displayed on a display device.

Japanese Patent No. 6859442 discloses a method in which grid-like chart information (model data) serving as the subject of image capture is stored in the image capturing apparatus, assuming use of a fisheye lens, and the lens distortion amount is estimated from the captured image and the chart information.

However, Japanese Patent Laid-Open No. 2014-155086 above does not take into consideration distortion of the lens mounted to the camera that acquires the moving image. Thus, when there is large distortion aberration of the lens, there will be a large deviation at the peripheral angle of view (at high image heights) between the reference image displayed in a superimposed manner and the captured moving image, making position alignment difficult.

Also, Japanese Patent No. 6859442 above discloses a method in which reference image information (chart model data) and lens distortion parameters estimated from the captured image are acquired, assuming use of a fisheye lens, and the position and attitude of the image capturing apparatus are then estimated. However, there is no mention regarding the method of positionally aligning the chart and the image capturing apparatus.

SUMMARY

Embodiments of the present disclosure have been made in view of the abovementioned problems, and provide an information processing apparatus that is able to acquire information for performing relative position alignment of a chart and an image capturing apparatus.

According to a first aspect of the present disclosure, there is provided an information processing apparatus comprising: at least one processor or circuit configured to function as: a first acquisition unit that acquires a captured image obtained by capturing an image of a chart for calibration; a second acquisition unit that acquires a reference image which is an image of the chart that serves as a reference; a third acquisition unit that acquires information on distortion aberration of a lens used to capture the captured image; a first generation unit that generates a pseudo image which is an image obtained by reflecting the distortion aberration in the reference image, based on the reference image and the information on distortion aberration; and a second generation unit that generates a composite image obtained by compositing the captured image and the pseudo image.

According to a second aspect of the present disclosure, there is provided an image capturing apparatus comprising: the lens; an image sensor for capturing the captured image; and the information processing apparatus described above.

According to a third aspect of the present disclosure, there is provided an information processing method comprising: executing first acquisition for acquiring a captured image obtained by capturing an image of a chart for calibration; executing second acquisition for acquiring a reference image which is an image of the chart that serves as a reference; executing third acquisition for acquiring information on distortion aberration of a lens used to capture the captured image; executing first generation for generating a pseudo image which is an image obtained by reflecting the distortion aberration in the reference image, based on the reference image and the information on distortion aberration; and executing second generation for generating a composite image obtained by compositing the captured image and the pseudo image.

According to a fourth aspect of the present disclosure, there is provided a non-transitory computer-readable storage medium storing a computer program for causing a computer to execute steps of an information processing method, the information processing method comprising: executing first acquisition for acquiring a captured image obtained by capturing an image of a chart for calibration; executing second acquisition for acquiring a reference image which is an image of the chart that serves as a reference; executing third acquisition for acquiring information on distortion aberration of a lens used to capture the captured image; executing first generation for generating a pseudo image which is an image obtained by reflecting the distortion aberration in the reference image, based on the reference image and the information on distortion aberration; and executing second generation for generating a composite image obtained by compositing the captured image and the pseudo image.

Further features of various embodiments will become apparent from the following description of exemplary embodiments with reference to the attached drawings.

BRIEF DESCRIPTION OF THE DRAWINGS

FIGS. 9A to 9E are diagrams illustrating processing for calculating the degree of deviation from a captured image and a pseudo image in the second embodiment.

DESCRIPTION OF THE EMBODIMENTS

Figure 1:
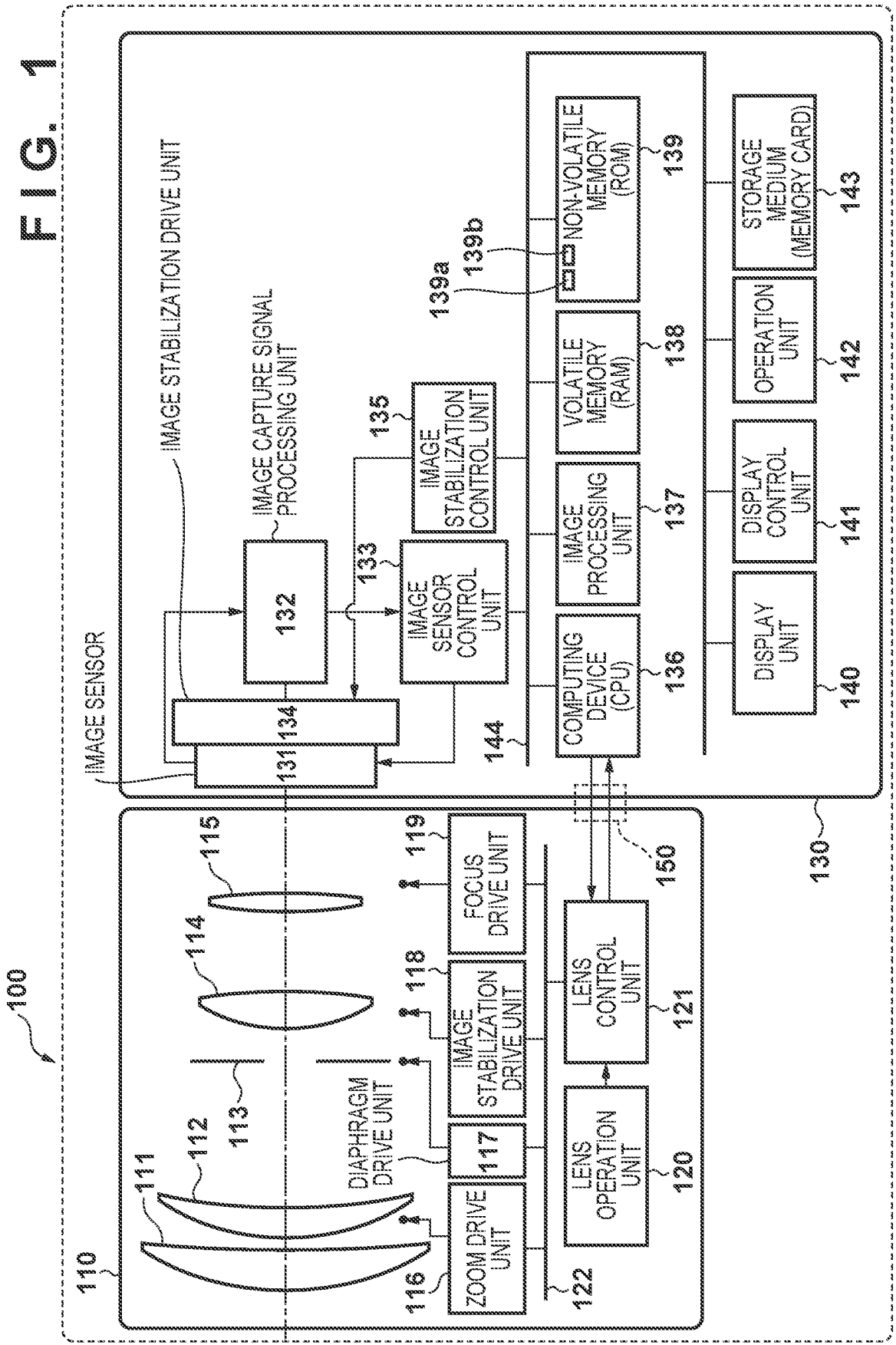
FIG. 1 is a block diagram showing the configuration of an image capturing apparatus according to a first embodiment of the present disclosure.

Hereinafter, embodiments will be described in detail with reference to the attached drawings. Note, the following embodiments are not intended to limit the scope of every embodiment. Multiple features are described in the embodiments, but limitation is not made to embodiments that require all such features, and multiple such features may be combined as appropriate.

Furthermore, in the attached drawings, the same reference numerals are given to the same or similar configurations, and redundant description thereof is omitted.

First Embodiment

Configuration of Image Capturing Apparatus Hereinafter, the configuration of an image capturing apparatus which is a first embodiment of an information processing apparatus of the present disclosure will be described. FIG. 1 is a block diagram showing the configuration of an image capturing apparatus 100.

In FIG. 1, the image capturing apparatus 100 is constituted to include an image capture control device 130 and an image capturing lens 110 that is interchangeably mounted to the image capture control device 130. Examples of the image capturing apparatus 100 include, but are not limited to, a video camera and a still camera capable of capturing an image of a subject and recording moving image or still image data to various recording media. Hereinafter, the image capturing apparatus 100 will be described as a camera 100.

A computing device 136 controls the entire image capture control device 130. Also, the computing device 136 transmits, to a lens control unit 121 via an electrical contact unit 150, commands for driving a lens group and a diaphragm provided in the image capturing lens 110, and commands for causing the image capturing lens 110 to transmit lens information (optical information, etc.) held therein to the image capture control device 130.

The image capturing lens 110 is constituted as a lens unit provided with an image capturing optical system that includes a fixed lens group 111, a zoom lens 112, a diaphragm 113, an image stabilization lens 114, and a focusing lens 115. Also, a drive unit for driving the lenses and the diaphragm is connected to a lens control unit 121 via a bus 122, and is controlled by the lens control unit 121. The lens control unit 121 controls the various lenses and the diaphragm via a zoom drive unit 116, a diaphragm drive unit 117, an image stabilization drive unit 118, and a focus drive unit 119, in accordance with commands from the computing device 136.

The diaphragm drive unit 117 adjusts an aperture of the diaphragm 113 to adjust the amount of light during image capture, by driving the diaphragm 113. The zoom drive unit 116 changes the focal length by driving the zoom lens 112. The image stabilization drive unit 118 reduces image blur caused by camera shake, by driving the image stabilization lens 114, in response to shaking of the image capturing lens 110. The focus drive unit 119 controls the focus state by driving the focusing lens 115. The lenses 111, 112, 114 and 115 are succinctly shown as a single lens in FIG. 1, but are normally constituted by a plurality of lenses.

Electrical contacts (terminal on image capturing lens side/terminal on image capture control device side) respectively corresponding to two communication lines that are used in communication between the image capturing lens 110 and the image capture control device 130 are disposed in the electrical contact unit 150. The lens control unit 121 communicates with the image capture control device 130 via the electrical contact unit 150, and controls driving of the zoom drive unit 116, the diaphragm drive unit 117 and the focus drive unit 119 according to operation information from a lens operation unit 120. Also, the lens control unit 121 communicates with the image capture control device 130 via the electrical contact unit 150, and receives commands from the computing device 136. Furthermore, lens information (optical information, etc.) held in the image capturing lens 110 is transmitted based on transmission requests from the image capture control device 130 side (hereinafter, communication between the lens control unit 121 and the computing device 136 will be referred to as lens communication).

The lens operation unit 120 is provided with operation members such as a zoom operation ring, a focusing operation ring, a diaphragm operation ring, and an operation switch for turning in-lens image stabilization ON/OFF. When each of these operation members is operated by a user, an operation instruction signal is output to the lens control unit 121, and the lens control unit 121 performs control appropriate to the operation.

A subject image that is formed on an image sensor 131 by light beams that pass through the image capturing optical system of the image capturing lens 110 is converted to an electrical signal by the image sensor 131. The image sensor 131 is a photoelectric conversion device that converts the subject image (optical image) to an electrical signal through photoelectric conversion. The electrical signal obtained through photoelectric conversion of the subject image formed on the image sensor 131 is processed as an image signal (image data) by an image capture signal processing unit 132.

An image sensor control unit 133 receives, from the computing device 136, an instruction indicating the storage time of the image sensor 131 and the value of gain to be output from the image sensor 131 to the image capture signal processing unit 132, and controls the image sensor 131.

Image data that is output from the image capture signal processing unit 132 is sent to the image sensor control unit 133 and temporarily stored in a volatile memory 138. Furthermore, the image data is recorded to a storage medium 143, such as a memory card, after undergoing processing such as correction processing and compression processing in an image processing unit 137.

In parallel therewith, a display control unit 141 performs processing for reducing/enlarging image data stored in the volatile memory 138 to an optimal size for a display unit 140, such as a display installed in the image capture control device 130, based on commands from the computing device 136. The image data processed to an optimal size is temporarily stored again in the volatile memory 138 in a different region from before processing. Furthermore, the display control unit 141 superimposes image capturing information, such as exposure settings, on the image data with characters, icons and the like. Images are displayed by transmitting image data on which various information is superimposed to the display unit 140. The user is thereby able to observe captured images in real time (hereinafter, images that can be observed in real time will be referred to as live view images). The display control unit 141 also controls processing for superimposing pseudo images on captured images that is implemented in the present embodiment.

An image stabilization control unit 135 controls the image sensor 131 in a direction in which image blur due to camera shake is corrected, via an image stabilization drive unit 134, based on commands from the computing device 136. The image stabilization drive unit 134 can also be driven in conjunction with the image stabilization drive unit 118 of the image capturing lens 110, enabling image stabilization over an even greater range than when image stabilization is performed by only the image stabilization drive unit 134.

An operation unit 142 is an operation member that allows the user to instruct the various units provided in the image capture control device 130, and includes operation switches, operation rings, operation levers or a touch panel installed on the display unit 140, for example, that control operations such as image capture and the focus adjustment. Instructions relating to driving conditions of the camera 100 that are input through operation of the operation unit 142 by the user are transmitted to the computing device 136. The computing device 136 then transmits commands to respective units, based on this operation instruction signal.

The volatile memory 138 is used not only for temporary storage of image data described above, but also for storing temporary data, lens information acquired from the image capturing lens 110, and the like that are used in processing by the respective units of the image capture control device 130.

The non-volatile memory 139 stores a control program necessary for the operations of the camera 100. When the camera 100 is started by a user operation (when the camera 100 transitions from power OFF to power ON), the control program stored in the non-volatile memory 139 is read (loaded) to part of the volatile memory 138. The computing device 136 controls the operations of the camera 100 in accordance with the control program loaded in the volatile memory 138. The non-volatile memory 139 is also writable, and has a chart information storage unit 139a and a lens distortion information storage unit 139b that respectively store chart information and information on distortion aberration that are used in the present embodiment.

The storage medium 143 is a readable-writable memory card such as an SD card, and is used in order to save captured images (moving images or still images), metadata associated with the images, and the like. It is also envisaged that the storage medium 143 will be used instead of the chart information storage unit 139a and the lens distortion information storage unit 139b of the non-volatile memory 139.

Outline of Calibration Processing

Figure 2:
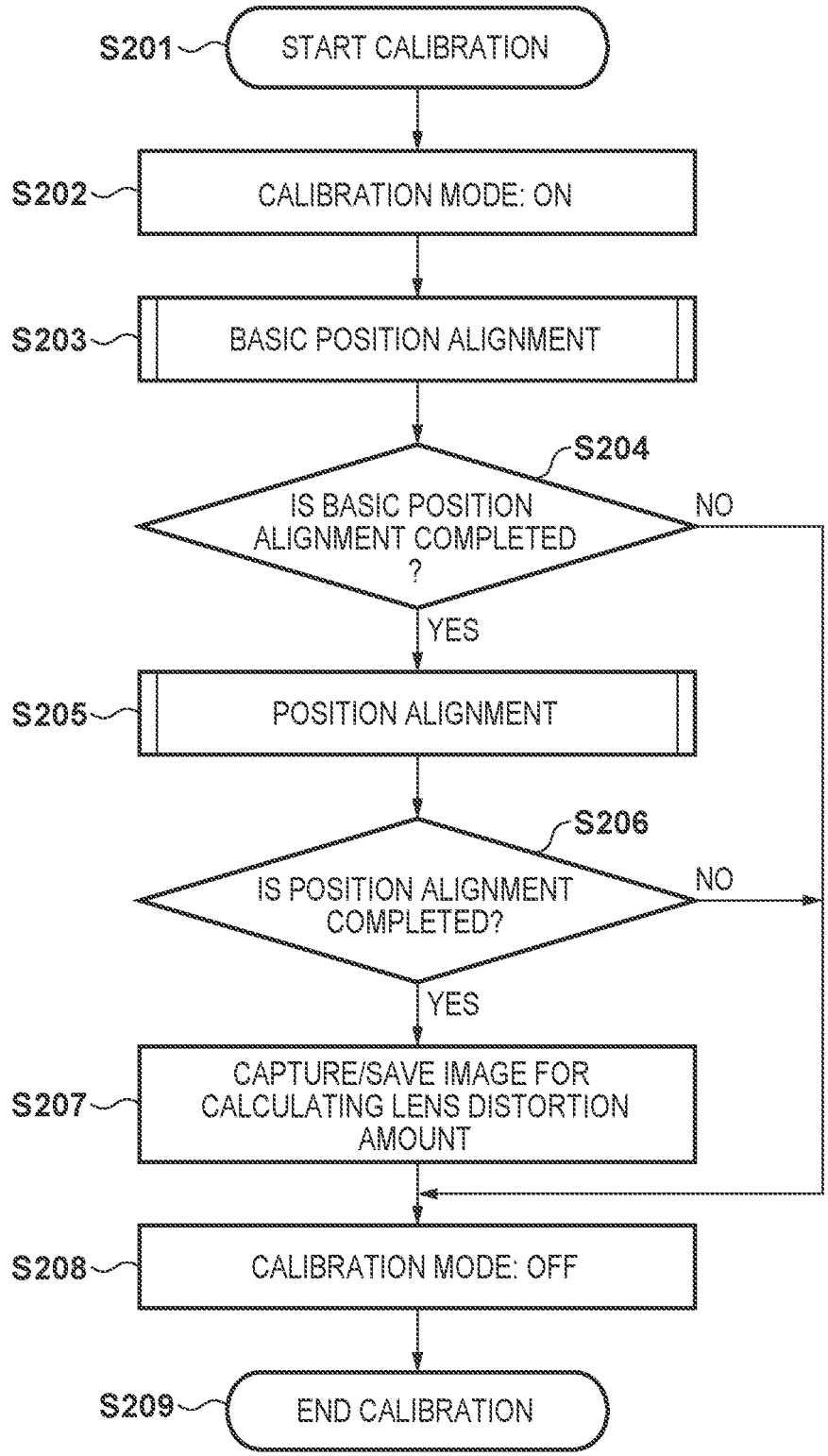
FIG. 2 is a flowchart showing calibration processing of the image capturing apparatus.

Next, calibration processing will be outlined using FIG. 2. In the present embodiment, in order to correct distortion aberration of the image capturing lens 110, an image of a calibration chart for aberration correction actually needs to be captured with the camera 100. Calibration processing refers to an operation that involves positionally aligning the calibration chart and the camera 100, and then capturing an image of the calibration chart with the camera 100 and acquiring information on the distortion aberration of the image capturing lens 110.

The following description assumes that the above-described image capture control is started before executing calibration processing, and that the user is able to observe live view images. Also, the calibration operation itself is performed after the user selects, via the operation unit 142, to execute calibration processing from a menu displayed on the display unit 140. Also, the following description assumes that the image of the chart captured by the camera 100 is always in focus. Focusing may be performed manually or by autofocus, and is not particularly limited in terms of method.

First, in step S201, the computing device 136 starts the calibration processing and advances the processing to step S202.

In step S202, the computing device 136 turns a calibration mode ON. Specifically, the computing device 136 changes a flag for the calibration mode that is stored in the volatile memory 138 to ON.

In step S203, the computing device 136 performs basic position alignment processing of the camera 100 and the calibration chart. In this basic position alignment processing, rough position alignment of the optical axis center of the camera 100 and the center of the calibration chart and alignment of the image capture angle of view are performed in the initial position alignment. This basic position alignment processing will be described in detail later.

In step S204, the computing device 136 determines whether the basic position alignment processing of step S203 is completed. If the basic position alignment processing is completed, the computing device 136 advances the processing to step S205, and, if not completed (e.g., an error occurred during basic position alignment or the processing stopped by the user), advances the processing to step S208.

In step S205, the computing device 136 performs position alignment processing of the camera 100 and the calibration chart. In this position alignment processing, in comparison to the basic position alignment processing of step S203, the computing device 136 performs detailed position alignment while checking peripheral (high image height) portions of the image, and sets up the camera 100 and the calibration chart in a state where image capture for calculating the amount of distortion of the lens can be performed. This position alignment processing will be described in detail later.

In step S206, the computing device 136 determines whether the position alignment processing of step S205 is completed. If the position alignment is completed, the computing device 136 advances the processing to step S207, and, if not completed (error occurred during position alignment or processing stopped by the user), advances the processing to step S208.

In step S207, the computing device 136 captures an image of the calibration chart after having set up the camera 100 and the chart on which position alignment processing was completed. The computing device 136 saves the captured image to the storage medium 143 and advances the processing to step S208.

In step S208, the computing device 136 turns the calibration mode OFF. The computing device 136 then advances the processing to step S209 and ends the calibration processing.

It is envisaged that actual image capturing will be performed with multiple image capturing lenses or at multiple focal lengths in the case of a zoom lens. In this case, the processing of steps S201 to S209 in FIG. 2 is repeatedly executed for every image capturing lens or every focal length.

By executing the above processing, it becomes possible to acquire an image for calculating the amount of distortion of the lens after having accurately performed position alignment of the calibration chart and the camera. In post-production of VFX compositing, the amount of distortion of the lens is calculated from this captured image by using a dedicated application, and is used in various compositing processing.

Basic Position Alignment Processing

Next, the operations of basic position alignment processing in step S203 of FIG. 2 will be described in detail using FIG. 3. The processing of the flowcharts in the present embodiment is executed by the computing device 136 based on a computer program loaded from the non-volatile memory 139 to the volatile memory 138 when the camera 100 is started. This similarly applies to the operations of subsequent flowcharts.

First, in step S301, the computing device 136 starts the basic position alignment processing.

In step S302, the computing device 136 reads out the image captured during the image capture control described above from the volatile memory 138 and temporarily saves the read image to another region of the volatile memory 138.

Also, chart information that is used for position alignment is acquired from the chart information storage unit 139a.

In step S303, the computing device 136 generates a pseudo image, based on the chart information acquired in step S302. A pseudo image as referred to here is an image prior to undergoing distortion processing or an image on which distortion processing is not performed. Here, distortion processing is processing for intentionally distorting a chart image in which distortion aberration of the lens does not originally appear to match the distortion aberration of the lens, and converting the chart image to an image that reflects the distortion aberration (distortion amount) of the lens. Hereinafter, a pseudo image of a chart prior to undergoing distortion processing or on which distortion processing is not performed will be referred to as a reference image.

Chart information is information necessary in order to generate a reference image or a pseudo image. Examples include an actual calibration chart image serving as the subject of image capture and the size of one grid portion of the calibration chart. As long as the above information is associated with the focal length of the image capturing lens, it is possible to automatically perform processing according to the focal length, even in the case where the image capturing lens is swapped out or the focal length of a zoom lens is changed. Also, it is assumed that, prior to executing the calibration processing, the user stores chart information in the chart information storage unit 139a of the image capture control device 130 or in the storage medium 143.

In the case where, however, chart information is not stored or the chart information differs greatly from the actual captured image, the following configuration may be adopted. That is, a chart information generation mode is provided, and chart information is generated through selection or input by the user on the image capture control device 130. Alternatively, chart information is generated by detecting the size of one grid portion of the center portion of the captured image. The generated chart information is then saved to the chart information storage unit 139a as new chart information.

Here, an example of reference image generation that is based on chart information will be described. Here, the description is premised on a chart image corresponding to the focal length being stored in the non-volatile memory 139a.

First, the computing device 136 reads out chart information from the non-volatile memory 139a. Additionally, the computing device 136 acquires the focal length of the image capturing lens 110 mounted on the image capture control device 130 through lens communication. Alternatively, with a lens that does not support lens communication, the user may set the focal length in the image capture control device 130.

The read chart information is a chart image that corresponds to a focal length, and thus, in the case where this focal length differs from the focal length acquired through lens communication, processing that adjusts for the difference in focal length needs to be performed on the chart image. In view of this, the computing device 136 notifies the focal length of the image capturing lens to the image processing unit 137, and instructs the image processing unit 137 to perform enlargement/reduction processing appropriate to the difference in focal length (magnification). The image processing unit 137 performs enlargement/reduction processing on the read chart image, based on the instruction. Following, the computing device 136 temporarily saves the generated reference image to the volatile memory 138 and advances the processing to step S304.

In step S304, the computing device 136 performs processing for superimposing the reference image on the captured image with the display unit 140 and the display control unit 141. First, the display control unit 141 reads out the captured image and the reference image temporarily saved in the volatile memory 138. Image compositing is then performed such that the reference image is displayed to be overlaid on the captured image that is acquired. Hereinafter, this processing will be referred to as superimposition processing. Also, the image obtained through superimposition processing will be referred to as a superimposed image (composite image).

At this time, if the reference image is simply superimposed, the captured image underneath cannot be observed, and it is also be difficult to observe the difference between the captured image and the reference image. Thus, the display control unit 141 performs necessary image processing on the reference image. Examples include performing transparency processing on the reference image such that the captured image can be observed through the reference image, performing processing for converting the black grid portions of the pseudo image that correspond to the black grid portions of the chart in the captured image to another color such as red, and performing pattern processing. The display control unit 141 then temporarily saves the superimposed image to the volatile memory 138.

Following on, the display control unit 141 notifies the temporary storage destination of the superimposed image to the display unit 140, and instructs the display unit 140 to update display. The display unit 140 reads out the superimposed image that was temporarily saved from the volatile memory 138 and displays the superimposed image. By observing the superimposed image displayed on the display unit 140, the user is able to check the extent to which the captured image deviates from the pseudo image. In other words, it becomes possible for the user to observe position misalignment between the calibration chart and the camera. The user then changes the position or attitude of the camera 100 or the calibration chart so as to minimize this position misalignment, and performs position alignment.

An example of display screens during basic position alignment will be described using FIGS. 4A to 4D. FIGS. 4A to 4D show screens displayed on the display unit 140. Note that the calibration chart itself is a chart in which black and white grid portions are arrayed repetitively as described above, and, hereinafter, the black grid portions of the captured image will be represented by downward slanted hatching, and the black grid portions of the reference image or pseudo image will be represented by upward slanted hatching.

Figure 4A:
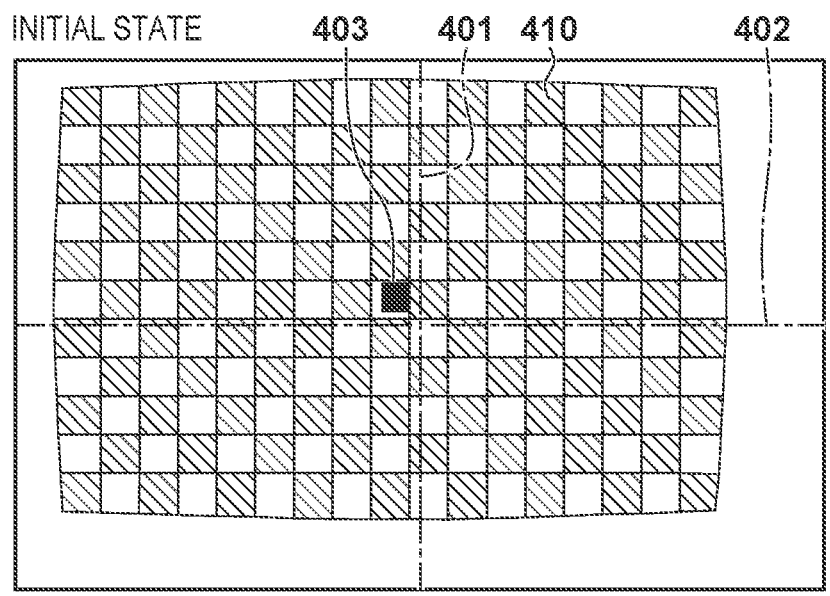
FIGS. 4A to 4D are diagrams illustrating display screens during basic position alignment processing.

FIG. 4A shows a state in which only a captured image 410 is displayed. Reference numerals 401 and 402 respectively denote a vertical marker and a horizontal marker that are shown to intersect at the optical center such that the center of the captured image is easily visible. Also, a black rectangular marker 403 is shown such that the center position of the calibration chart is easily visible, but a marker may actually be disposed at the center position of the calibration chart, or a rectangular portion that includes the center position may be set to a color other than black or white. Additionally, when implementing the superimposition processing, the display method or color may be changed such that center position alignment is easily confirmed visually by aligning the grid portion that includes the center position of the reference image with the marker or color of the calibration chart.

Figure 4B:
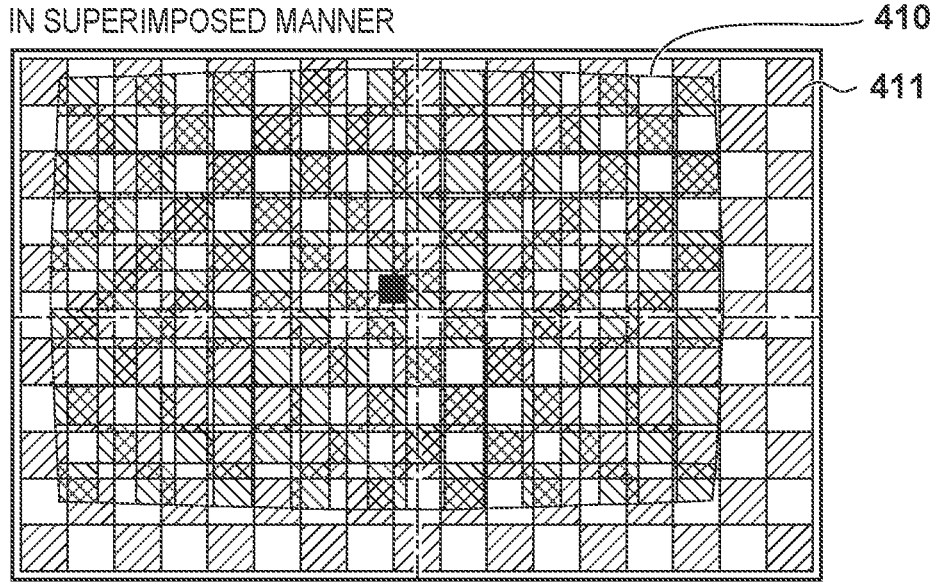

Next, FIG. 4B shows a state in which a reference image 411 is displayed in a superimposed manner with respect to a state in which only the captured image 410 of FIG. 4A is displayed. Basic position alignment is performed based on this reference image 411 displayed in a superimposed manner. In this example, the user changes the position or attitude of the camera 100 such that the optical axis center of the camera 100 coincides with the center of the calibration chart.

Figure 4C:
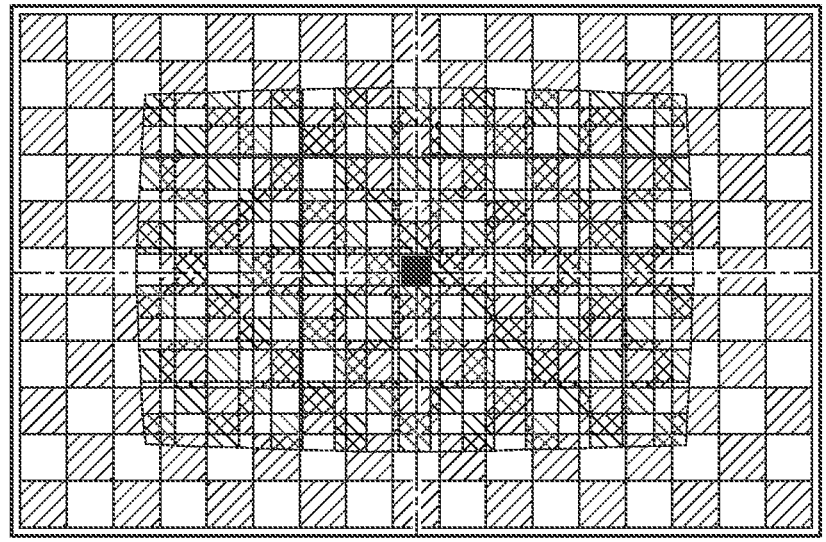

FIG. 4C show a state in which the center positions of the captured image 410 and the reference image 411 are aligned, and the captured image 410 and the reference image 411 are not yet matched (not matched in size). From this state, the user changes the position of the camera 100 such that the camera 100 approaches the chart and achieves the display state of FIG. 4D. By executing the above processing, basic position alignment of the camera 100 and the chart is completed.

Figure 4D:
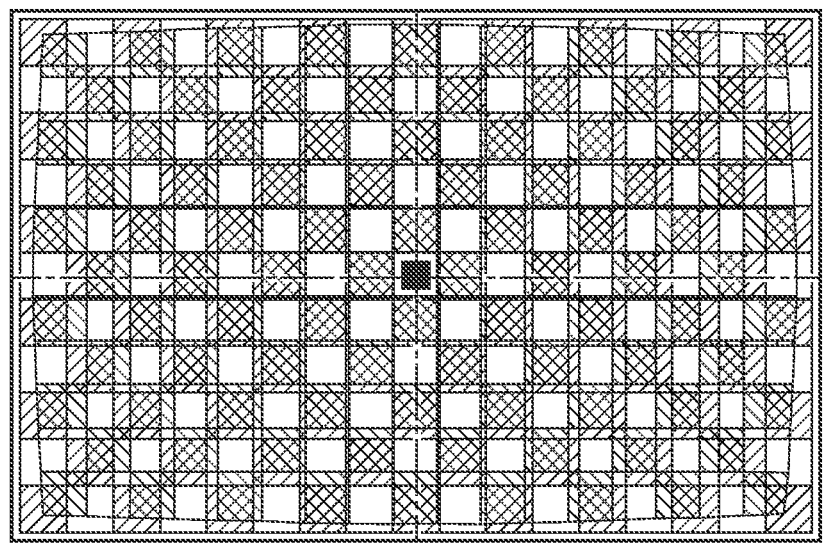

Also, as aforementioned, it is possible to perform enlargement/reduction processing on the reference image, according to the focal length that is acquired through lens communication or set by the user. However, depending on the image capturing lens, it may not be possible to enlarge/reduce the reference image, due to the focal length itself not being known. In such cases, from the state of FIG. 4C in which the sizes do not match, the user operates the operation unit 140 and performs enlargement/reduction of the reference image 411 until he or she is able to determine that the captured image 410 matches the reference image 411 visually (until a similar state to FIG. 4D is achieved).

Next, in step S305, the computing device 136 determines whether to continue basic position alignment. The purpose of this is to determine whether the user has completed basic position alignment. For example, button-like user interfaces "OK" and "CANCEL" are further displayed in a superimposed manner on the superimposed image, with "OK" being allocated to the case of the user having completed basic position alignment and "CANCEL" being allocated to the case of the user wanting to stop basic position alignment. If the user decides that basic position alignment is completed or decides to stop basic position alignment, he or she respectively selects "OK" (completed) or "CANCEL" (stop) via the operation unit 142. Following, the computing device 136 determines whether continuing basic position alignment processing was selected. If completed or stop is not selected, the computing device 136 returns the processing to step S302, and continues the processing of steps S302 to S304 until either completed or stop is selected or until the basic position alignment processing is forcibly ended via the operation unit 142. If either completed or stop is selected, the computing device 136 advances the processing to step S306.

In step S306, the computing device 136 determines whether completed or stop was selected in step S305, that is, whether basic position alignment has finished. If completed is selected in step S305, the computing device 136 advances the processing to step S307 and sets the basic position alignment result as "OK". Also, if stop is selected, the computing device 136 advances the processing to step S308, and sets the basic position alignment result as "CANCEL".

In step S309, the computing device 136 temporarily saves the basic position alignment result set in either step S307 or S308 to the volatile memory 138. Additionally, the computing device 136 saves the reference image at the time that basic position alignment was finished to the chart information storage unit 139a as chart information.

In step S310, the computing device 136 ends the basic position alignment processing.

Position Alignment Processing

Figure 5:
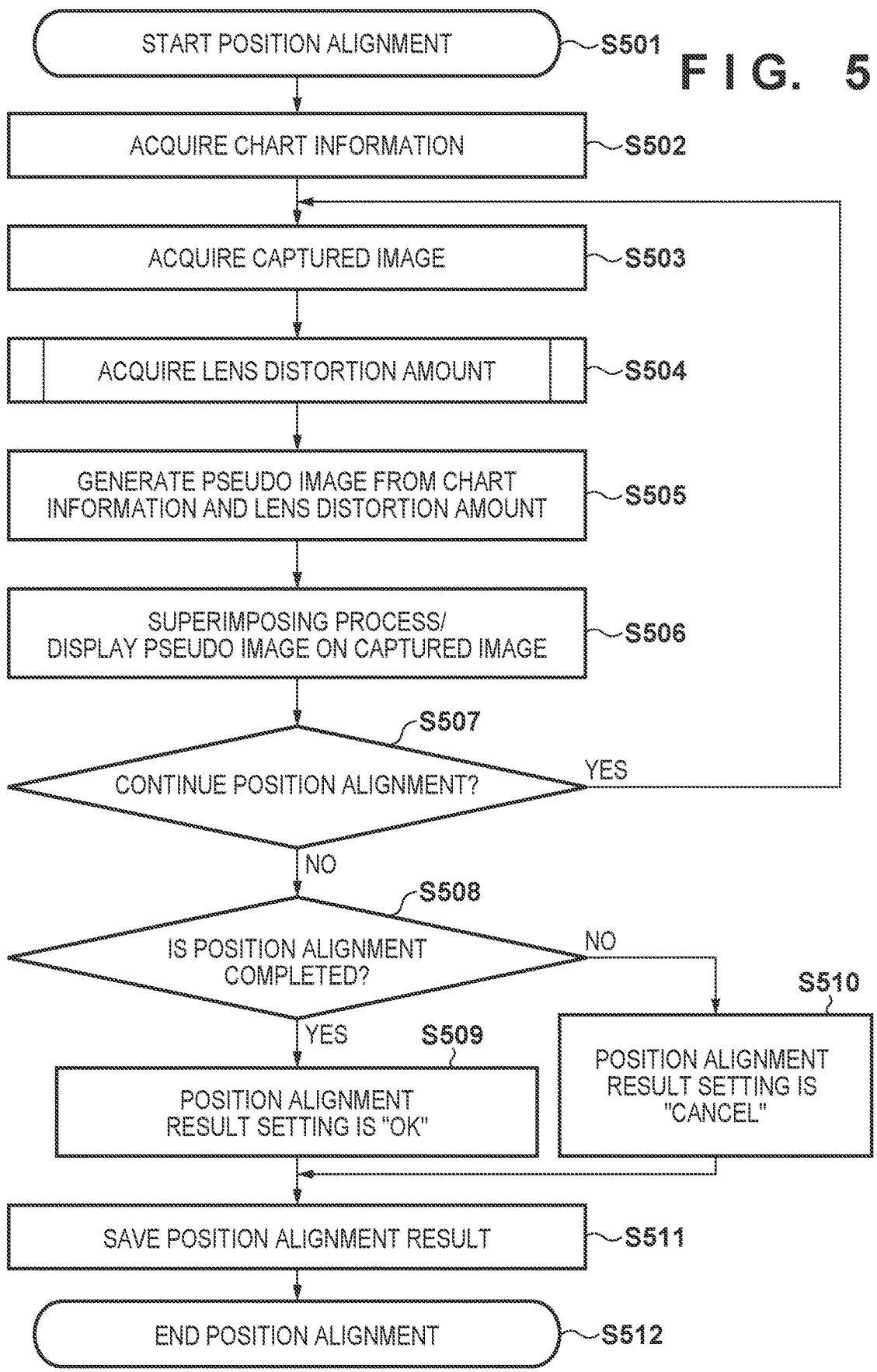
FIG. 5 is a flowchart showing position alignment processing.

Following, position alignment processing for performing position alignment with higher accuracy than the basic position alignment processing will be described using FIG. 5.

First, in step S501, the computing device 136 starts the position alignment processing.

In step S502, the computing device 136 reads out chart information from the chart information storage unit 139a in the non-volatile memory 139.

In step S503, the computing device 136 reads out the image captured during the image capture control described above from the volatile memory 138 and temporarily saves the read image to another region of the volatile memory 138.

In step S504, the computing device 136 performs lens distortion amount acquisition processing and advances the processing to step S504.

Figure 6A:
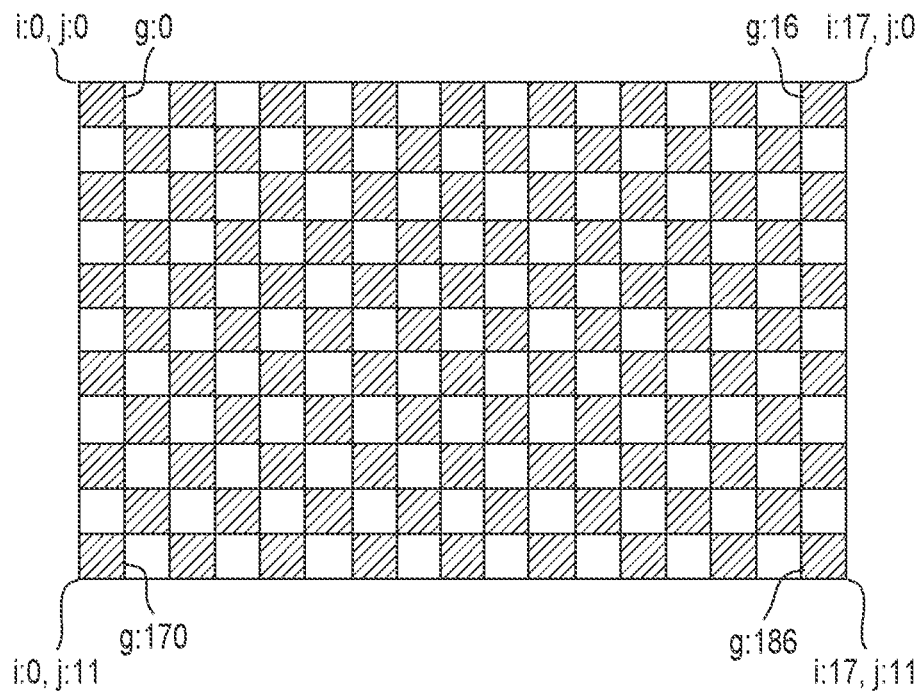
FIGS. 6A to 6C are diagrams illustrating processing for estimating a lens distortion amount.

An example of estimation processing, which is part of the lens distortion amount acquisition processing, will now be described using FIGS. 6A to 6C. FIG. 6A is a diagram illustrating grid information (information for identifying the positions of each grid portion and the four corners of each grid portion) of the calibration chart.

Here, the number of both black and white grid portions disposed in the horizontal direction and vertical direction are respectively 17 and 11, and in order to identify the positions of the four corners of each grid portion, numbers 0 to 17 are given horizontally (i0 to i17) and numbers 0 to 11 are given vertically (j0 to j11). Next, in order to identify each grid portion, numbers 0 to 186 are given sequentially from the upper left (g0 to g186). Accordingly, the coordinates of the four corners of the upper left grid portion g0 can be represented as upper left (xi0j0, yi0j0), upper right (xi1j0, yi1j0), lower left (xi0j1, yi0j1) and lower right (xi1j1, yi1j1).

Figure 6B:
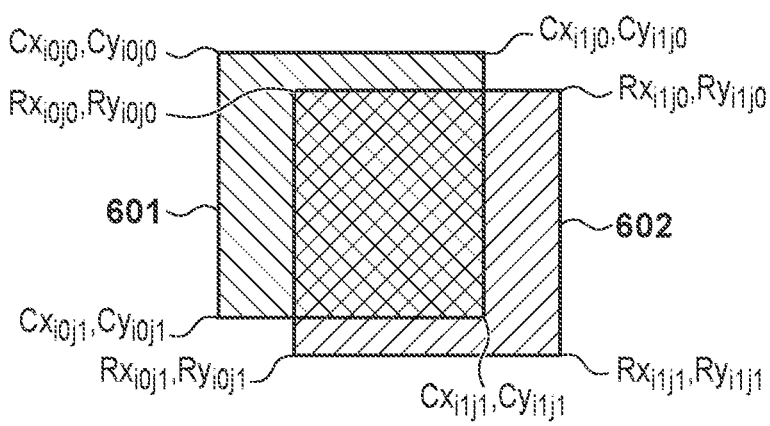
Figure 6C:
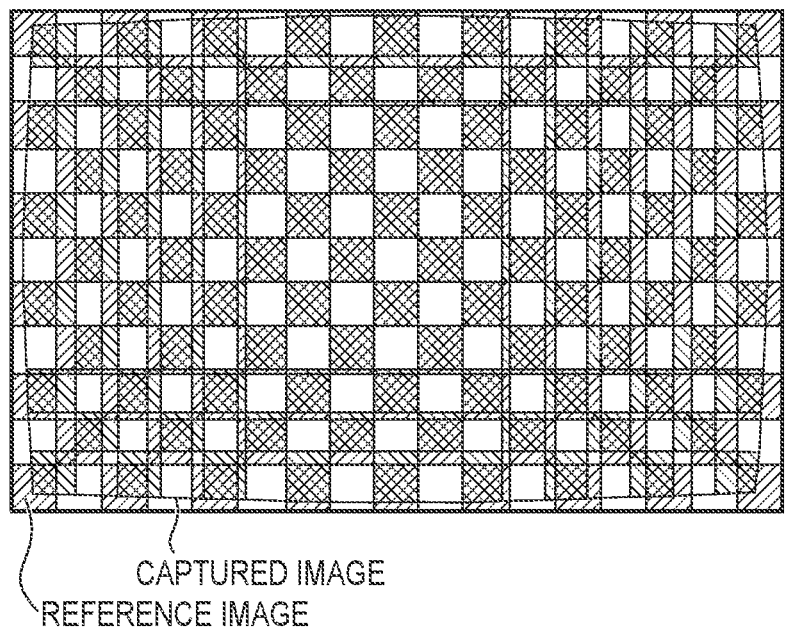

Furthermore, as shown in FIG. 6B, so as to be able to identify the respective coordinates of the captured image and the reference image, the coordinates of the four corners of a grid portion 601 of the captured image are given as upper left (Cxi0j0, Cyi0j0), upper right (Cxi1j0, Cyi1j0), lower left (Cxi0j1, Cyi0j1) and lower right (Cxi1j1, Cyi1j1), and the coordinates of the four corners of a grid portion 602 of the reference image are given as upper left (Rxi0j0, Ryi0j0), upper right (Rxi1j0, Ryi1j0), lower left (Rxi0j1, Ryi0j1) and lower right (Rxi1j1, Ryi1j1).

Next, estimation processing that is performed based on the above grid information of each grid portion will be described. First, lens distortion aberration is generally modeled with the following equations. In the following equations, xd and yd are coordinates with distortion, xu and yu are coordinates without distortion, and K1 to K5 are coefficients expressing the lens distortion amount.

$$xd=(1+K1r^2+K2r^4+K5r^6)xu+2K3xuyu+K4(r^2+2xu^2)$$

$$yd=(1+K1r^2+K2r^4+K5r^6)yu+K3(r^2+2yu^2)+2K4xuyu$$

$$r^2=xu^2+yu^2$$

The lens distortion amount calculated using these equations is saved to the lens distortion information storage unit 139b. At this time, the focal length, lens ID, serial number, and the like of the image capturing lens may be saved in association together with the lens distortion amount. This enables re-use of information in the case where calibration is performed again.

In the above equations, K3 and K4 represent tangential distortion aberration, which is often negligible in practical terms, and thus a simplified model as with the following equations is often used.

$$xd=(1+K1r^2+K2r^4+K5r^6)xu$$

$$yd=(1+K1r^2+K2r^4+K5r^6)yu$$

The upper left coordinates of the grid portion g=0 in FIG. 6A are as follows.

$$Cxi0j0=(1+K1r^2+K2r^4+K5r^6)Rxi0j0$$

$$Cyi0j0=(1+K1r^2+K2r^4+K5r^6)Ryi0j0$$

$$r^2=Rxi0j0^2+Ryi0j0^2$$

Using these relational equations, a search for the distortion amounts K1, K2, and K5 is performed, such that the coordinates of the four corners of each grid portion (g=0 to 186) of the captured image and the reference image match or are close values. If matching or close coordinates can be obtained as a result of the search, it can be determined that estimation is completed.

The present embodiment is described in terms of matching only the four corners of each grid portion, but the accuracy of the distortion amount that is estimated is improved by further partitioning the coordinates between the four corners of each grid portion after having achieved a certain degree of matching, and further increasing the number of coordinates that are compared. Also, in the present embodiment, the estimation processing is described in terms of searching for coefficients that express the distortion amount, but some embodiments are not limited thereto. Following, the computing device 136 saves the estimated lens distortion amount to the lens distortion information storage unit 139b.

Also, in the present embodiment, a method of estimating the lens distortion amount from a captured image and chart information that is stored in the image capture control device 130 is described. However, depending on the image capturing lens, a lens distortion amount corresponding to the state (focal length, etc.) of each lens may be stored in the image capturing lens 110 or in the image capture control device 130 (non-volatile memory 139). These lens distortion amounts are determined at the time of design or manufacture of the image capturing lenses. In the case where the distortion amount is stored in the image capturing lens, lens communication is performed in the lens distortion amount acquisition processing of step S504, and the distortion amount of each lens position at the time that communication is executed is acquired from the lens side. In the case where the distortion amount is stored on the image capture control device 130 side, first lens communication is performed and a unique number (hereinafter, lens ID) allocated to each image capturing lens is acquired. The lens distortion amount associated with the lens ID and each lens position are then read out from the non-volatile memory 139. A pseudo image described later may also be generated, based on these lens distortion amounts.

Next, in step S505, the computing device 136 generates a pseudo image from the lens distortion amount acquired in step S504 and the chart information. Since the processing before performing distortion processing is similar to the reference image generation processing in step S303 of FIG. 3, description thereof will be omitted. Following, the computing device 136 reads out the reference image temporarily saved to the volatile memory 138, and reads out the lens distortion amount stored in the non-volatile memory 139b. The computing device 136 then instructs the image processing unit 137 to perform distortion processing on the reference image. The image processing unit 137 generates a pseudo image in which distortion aberration is reflected from the read reference image and lens distortion amount, temporarily saves the generated pseudo image to the volatile memory 138, and advances the processing to step S506.

In step S506, the image processing unit 137 superimposes the pseudo image generated in step S505 on the captured image and displays the superimposed image. Note that since the processing itself is similar to the processing in step S304 of FIG. 3, description of the processing contents will be omitted. The user positionally aligns the camera 100 and the chart, by observing this superimposed image and matching the captured image and the pseudo image.

Figure 7A:
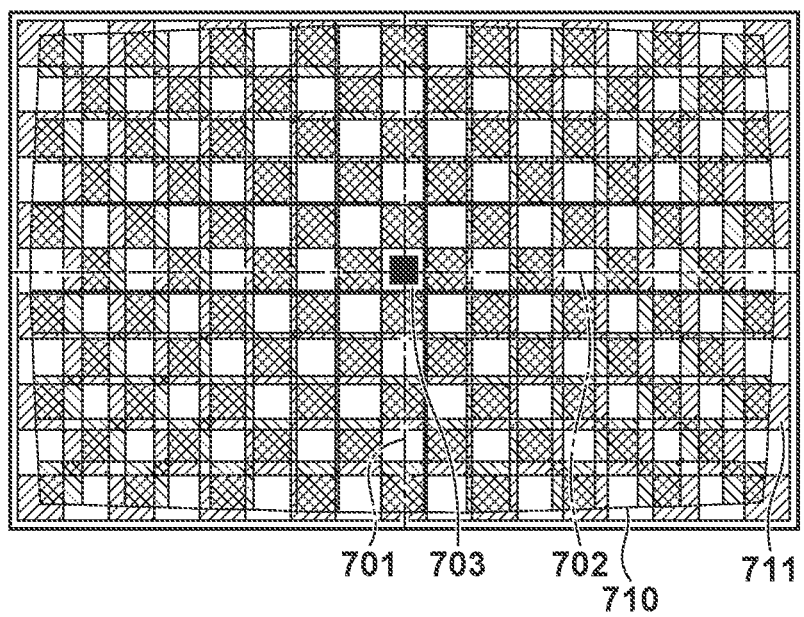
FIGS. 7A to 7C are diagrams illustrating display screens during position alignment processing.
Figure 7B:
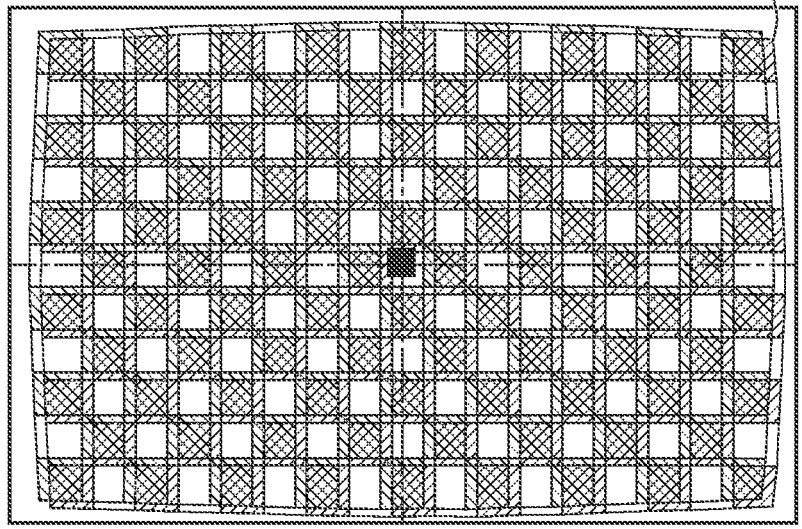
Figure 7C:
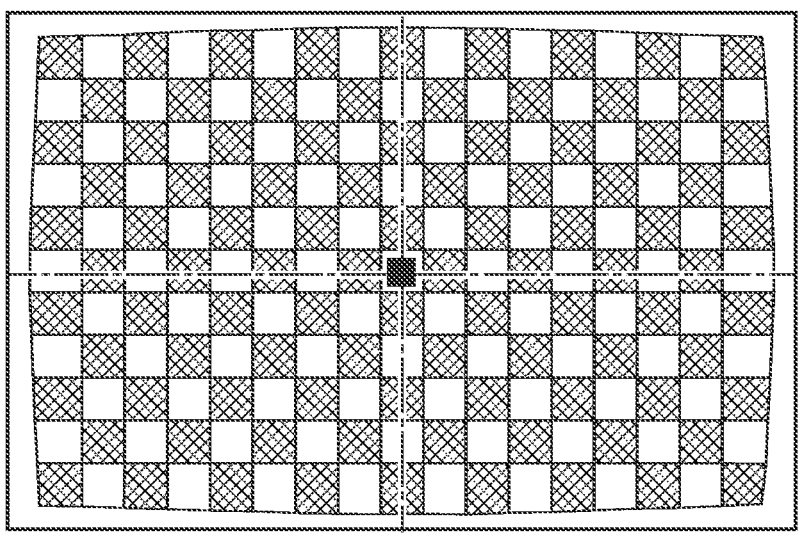

An example of the display screen during position alignment will now be described using FIGS. 7A to 7C. FIGS. 7A to 7C show screens displayed on the display unit 140. FIG. 7A shows a state in which the basic position alignment in steps S203 and S204 of FIG. 2 is completed. FIG. 7B shows a state in which a pseudo image 712 obtained by performing distortion processing on a reference image 711 is generated from a state in which the reference image 711 is displayed in a superimposed manner on a captured image 710 of FIG. 7A, and the generated pseudo image 712 is displayed in a superimposed manner. FIG. 7B shows an example in which the captured image and the pseudo image are slightly out of alignment. The user changes the position or attitude of the camera 100 from this state until the position alignment completion state of FIG. 7C is achieved, such that the captured image and the pseudo image match as closely as possible.

The pseudo image is generated after having constantly estimated the lens distortion amount while position alignment processing is being executed. Thus, it is assumed that the accuracy of distortion amount estimation will be greater, and the extent of deviation between the captured image and the pseudo image will be smaller, as the camera 100 and the chart approach a directly opposite positional relationship. Also, unlike the basic position alignment processing, it can be checked that the captured image and the pseudo image match up to the peripheral image height, and thus it becomes possible for the user to display image positions that he or she wants to check in an enlarged manner by operating the operation unit 140, and check the extent to which the captured image and the pseudo image match. As a result, even with a lens having high distortion, it becomes possible to accurately perform position alignment of the camera 100 and the chart, by matching the captured image and the pseudo image up to the peripheral image height.

Next, in step S507, the computing device 136 determines whether to continue position alignment. Note that since this processing is similar to the processing in step S305 of FIG. 3, description of the processing contents will be omitted. At this time, if completed or stop is not selected, the computing device 136 returns the processing to step S503. The processing from acquisition of the captured image to superimposed display of the pseudo image of steps S503 to S506 is continuously performed until either completed or stop is selected, or until the position alignment processing is forcibly ended via the operation unit 142. Also, if completed or stop is selected, the computing device 136 advances the processing to step S508.

Figure 3:
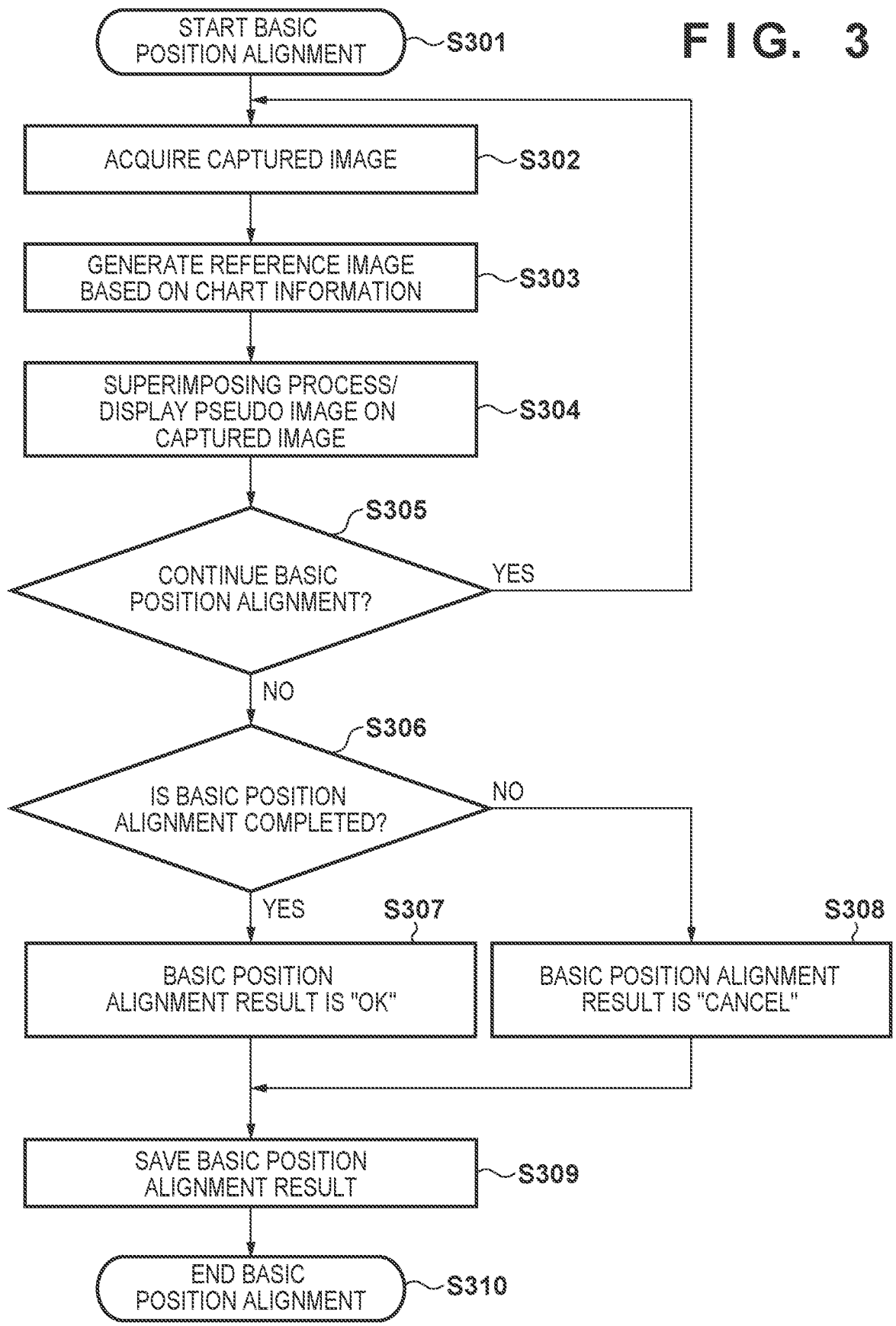
FIG. 3 is a flowchart showing basic position alignment processing.

Here, since the processing of steps S508 to S510 is similar to the processing in step S306 to S308 of FIG. 3, description thereof will be omitted.

In step S511, the computing device 136 temporarily saves the position alignment result set in either step S509 or S510 to the volatile memory 138. Additionally, the computing device 136 saves the pseudo image at the time that position alignment was finished to the chart information storage unit 139a as chart information.

In step S512, the computing device 136 ends the position alignment processing.

Note that, when executing processing for capturing and saving an image for calculating the lens distortion amount in step S207 of FIG. 2, various information, such as the position alignment result, lens information at the time that position alignment is finished, the lens distortion amount, and chart information, may be saved together with the image itself to the storage medium 143 as the image itself or as information (metadata) associated with the image.

Also, the present embodiment is described in terms of display of the superimposed image being updated to coincide with the cycle of pseudo image generation of steps S503 to S506 of the position alignment processing. This is in order to avoid the captured image that is displayed being different from the captured image at the time of pseudo image generation, in the case where the processing time taken for superimposed image generation in steps S504 to S506 is longer than a time period equivalent to one image capture cycle (readout cycle of the image sensor 131). In the case where, however, the time taken for superimposed image generation described above is shorter than the time period of one image capture cycle, it becomes possible to perform superimposed image generation and display update to coincide with the image capture cycle. Also, in the case where it is possible to delay the display update cycle, display update may be performed after having generated the pseudo image in accordance with movement of the camera 100. Note that movement of the camera 100 can be detected with a method such as detecting that the captured image has changed or providing a gyro sensor or the like in the image capture control device 130 and detecting movement, such as a change in attitude.

Also, the present embodiment is described in terms of performing position alignment processing after performing basic position alignment processing. However, in the case where the above-described lens distortion amount is stored in the image capturing lens 110 or the image capture control device 130, or in the case where the lens distortion amount can be estimated even without performing center position alignment (a chart is included in the entire angle of view), position alignment processing may be executed first.

As described above, in the present embodiment, chart information that is the subject of image capture is stored in the image capture control device, and a pseudo image obtained by performing distortion processing is generated from the chart information and information on the lens distortion amount. Then, by displaying the pseudo image on the captured image in a superimposed manner, it becomes possible to accurately and efficiently performing position alignment of the image capturing apparatus and the chart.

Second Embodiment

In the first embodiment, a method for accurately and efficiently performing position alignment of an image capturing apparatus and a chart, by generating a pseudo image obtained by performing distortion processing from chart information and information on the lens distortion amount that are stored in the image capture control device, and displaying the generated pseudo image on the captured image in a superimposed manner has been described. In a second embodiment, a method for accurately performing position alignment, by calculating the degree of deviation between the captured image and the pseudo image, and further superimposing information and instructions appropriate to the calculated degree of deviation on the image obtained by displaying the pseudo image on the captured image in a superimposed manner will be described.

Since the outline of the processing of the second embodiment is similar to the processing of FIG. 2 described in the first embodiment, description thereof will be omitted. Since the position alignment processing in step S205 of FIG. 2 in the second embodiment differs from the first embodiment, the processing contents thereof will be described.

Figure 8:
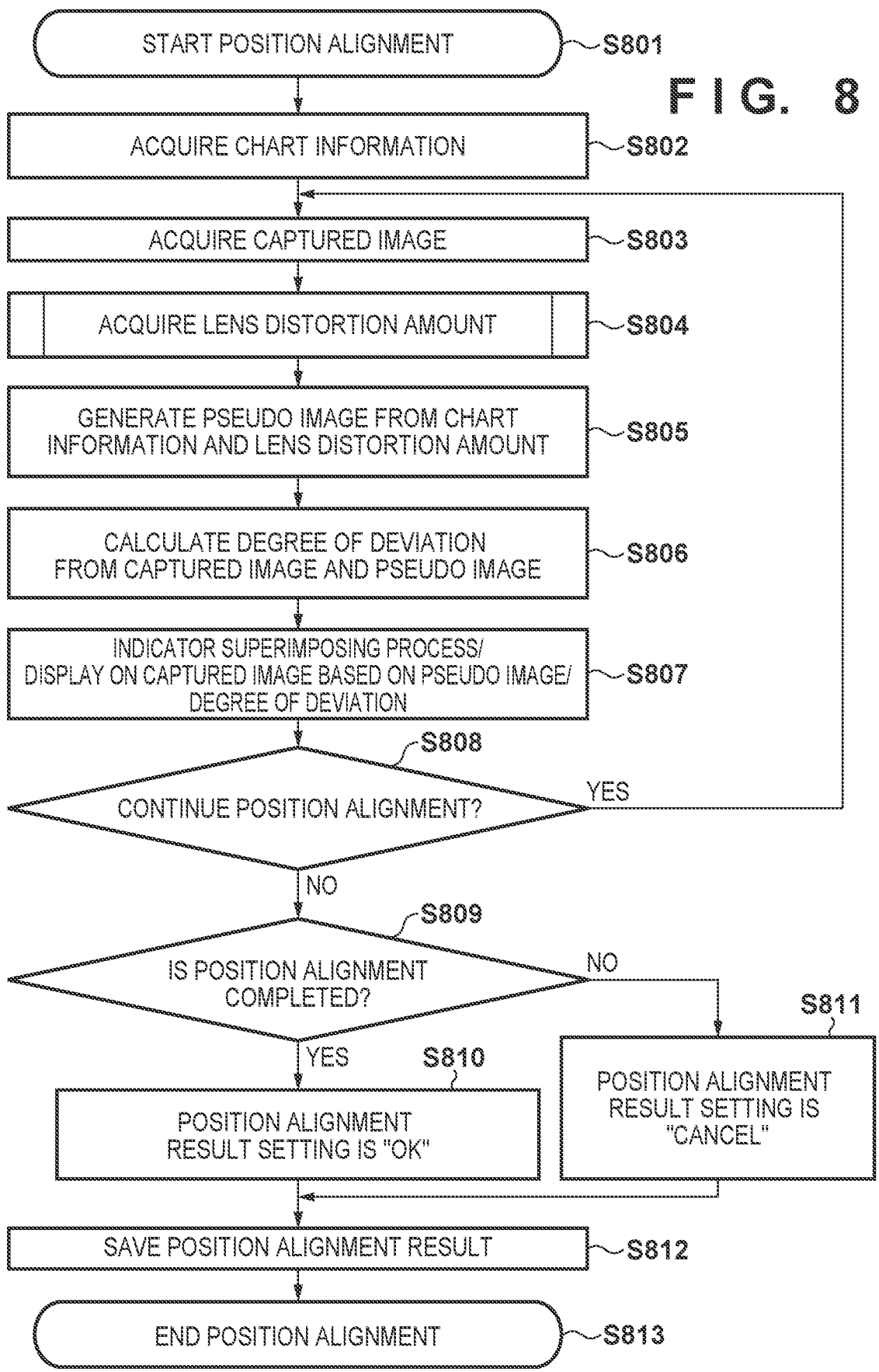
FIG. 8 is a flowchart showing position alignment processing of a second embodiment.

First, the position alignment processing in the second embodiment will be described, with reference to FIG. 8. Note that since the processing of steps S801 to S805 is similar to the processing in steps S501 to S505 of FIG. 5 of the first embodiment and the processing of steps S808 to S813 is similar to the processing in steps S507 to S512, a description thereof will be omitted.

The computing device 136 executes the processing of steps S801 to S805 and temporarily saves the captured image and the pseudo image to the volatile memory 138.

In step S806, the computing device 136 calculates the degree of deviation from the captured image and the pseudo image. An example of the method of calculating the degree of deviation will be described later using FIGS. 9A to 9E. Following on, the computing device 136 temporarily saves an evaluation value that is based on the calculated degree of deviation to the volatile memory 138.

In step S807, the computing device 136 performs processing for superimposing the pseudo image on the captured image with the display unit 140 and the display control unit 141. Since this superimposition processing is similar to the processing in step S506 of FIG. 5 of the first embodiment, description thereof will be omitted.

Following, in order to match the captured image and the pseudo image from the evaluation value that is based on the degree of deviation calculated in step S806, the computing device 136 generates a graphical user interface (GUI) that serves as an indicator for prompting the user to change the position or attitude of the camera 100, and further displays the generated GUI on the superimposed image in a superimposed manner. An example of displaying an indicator for moving the camera 100 will be described later using FIGS. 10A to 10C.

Also, in the present embodiment, the degree of deviation is represented by distances and directions (vectors) of the four corners (feature points) of corresponding grid portions of the captured image and the pseudo image, but may be represented by distances and directions of the center of gravity points of corresponding grid portions (specific regions) of the captured image and the pseudo image.

In step S808, if the user selects position alignment completed or stop position alignment, the computing device 136 advances the processing to step S809 and executes the processing of steps S809 to S812.

The computing device 136 then ends the position alignment processing in step S813.

Next, an example of the method of calculating the degree of deviation will be described using FIGS. 9A to 9E. Here, the distances and directions (vectors) of the positions of the four corners of corresponding grid portions of the captured image and the pseudo image are used. Also, the information (numbers) for identifying the position of each grid portion and the positions of the four corners of each grid portion is similar to FIG. 6A.

Figure 9A:
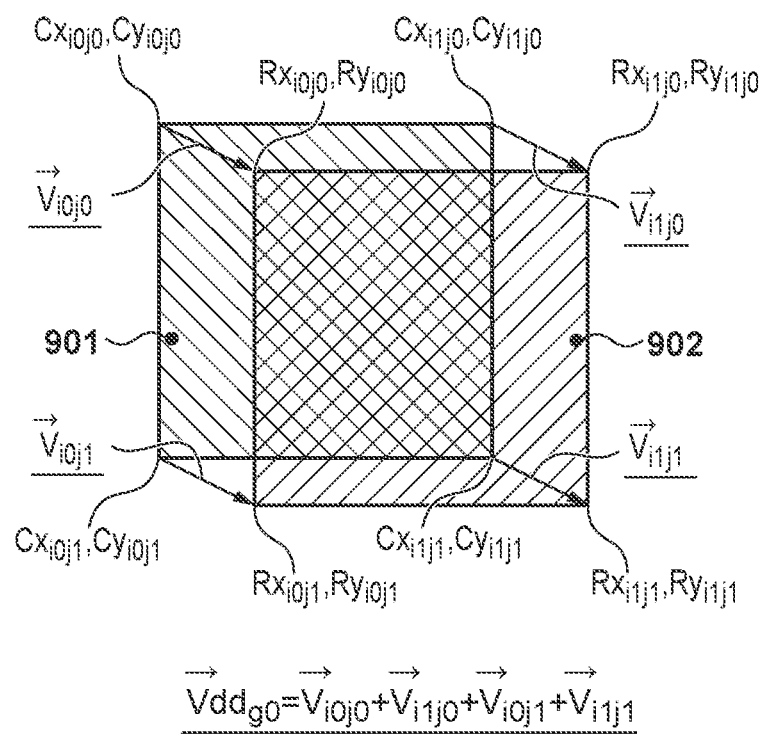

FIG. 9A is a diagram for describing calculation of the degree of deviation of the upper left grid portion (grid portion number: g=0). The coordinates of the four corners of a grid portion 901 on the captured image side are upper left (Cxi0j0, Cyi0j0), upper right (Cxi1j0, Cyi1j0), lower left (Cxi0j1, Cyi0j1), and lower right (Cxi1j1, Cyi1j1). Also, the coordinates of the four corners of a grid portion 902 on the pseudo image side are upper left (Rxi0j0, Ryi0j0), upper right (Rxi1j0, Ryi1j0), lower left (Rxi0j1, Ryi0j1), and lower right (Rxi1j1, Ryi1j1). The subsequent processing will be described taking the upper left as an example.

A distance and direction (vector) Vi0j0 of the upper left of the grid portion 901 on the captured image side to the upper left of the grid portion 902 on the pseudo image side is calculated. At this time, Vi0j0 is represented by (Rxi0j0−Cxi0j0, Ryi0j0−Cyi0j0). Following, the degrees of deviation of the upper right Vi1j0, the lower left Vi0j1, and the lower right Vi1j1 are calculated. The degree of deviation of the grid portion (grid portion number: g=0) is then represented by Vddg0=(Vi0j0+Vi1j0+Vi0j1+Vi1j1). This degree of deviation is calculated for all the grid portions or either the black or white grid portions. Following, the computing device 136 temporarily saves the degree of deviation calculated for every grid portion to the volatile memory 138.

Next, the computing device 136 calculates an evaluation value that is based on the degrees of deviation, and displays an indicator for moving the camera 100. An example of evaluation value calculation that is based on the degrees of deviation will be described. For example, the sum total of the degrees of deviation VddgN (N=0 to 186) of the grid portions described above is calculated. In FIG. 9B or 9C, the result will be that there is no deviation between the captured image and the pseudo image. Also, in FIG. 9D or 9E, the result will be that the pseudo image is out of alignment with the captured image to the lower side or the right side. Also, the chart may be divided into four quadrants with reference to the optical axis center of the camera 100, the sum total may be calculated for every quadrant, and the difference between the quadrants or the sum of the quadrants may be further calculated.

Figure 10A:
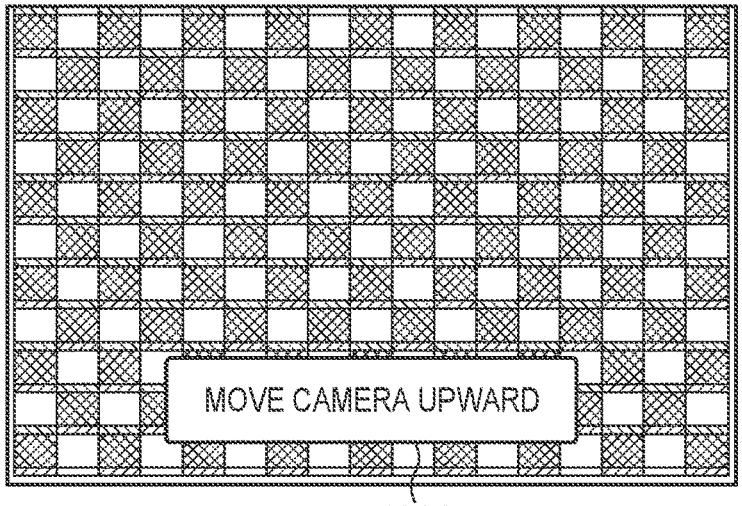
FIGS. 10A to 10C are diagrams illustrating display screens of indicators that are based on the degree of deviation.

Example display of movement indicators will be described using FIGS. 10A to 10C. FIG. 10A shows an example in which a message about the movement direction of the camera 100 is further displayed in a superimposed manner on the superimposed image. The user changes the position of the camera 100 in accordance with the message and finely adjusts the position until the message disappears or a message indicating completion of position alignment is displayed.

Figure 10B:
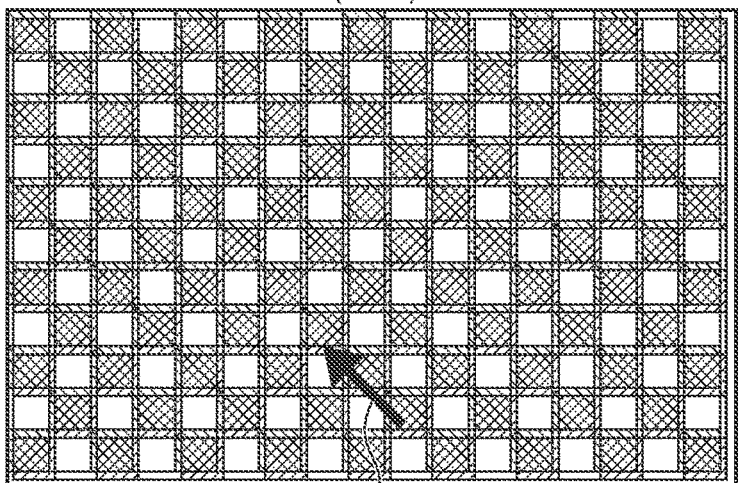

FIG. 10B shows an example in which a graphical figure indicating the movement direction of the camera 100 is displayed. An arrow mark indicating the movement direction is displayed, and the length or size of the arrow may be changed according to the value of the movement amount.

Figure 10C:
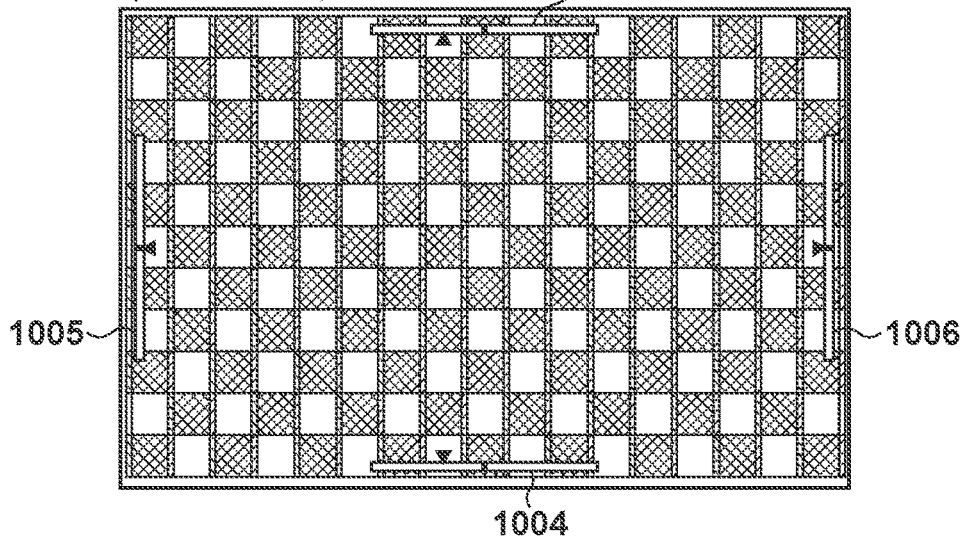

FIG. 10C show an example in which the movement direction and a rough movement amount of the camera 100 are displayed as guides with bar gauges. Bar gauges 1003 to 1006 in FIG. 10C are user interfaces for guiding movement of the camera 100. The bar gauges 1003 and 1004 indicate the horizontal direction, and the bar gauges 1005 and 1006 indicate the vertical direction.

As evaluation values for displaying the bar gauges, the degrees of deviation of the four quadrants described above is used. The horizontal direction bar gauge 1003 in the upper portion of the image indicates the difference in the degree of deviation of the first quadrant and the fourth quadrant, and the horizontal direction bar gauge 1004 in the lower portion of the image indicates the difference in the degree of deviation of the second quadrant and the third quadrant.

Similarly, the vertical direction bar gauge 1005 on the left side of the image indicates the difference in the degree of deviation of the third quadrant and the fourth quadrant, and the vertical direction bar gauge 1006 on the right side of the image indicates the difference in the degree of deviation of the first quadrant and the second quadrant.

The black triangles indicate the current state, with FIG. 10C showing a state in which the vertical position is aligned but the horizontal position is misaligned to the left side. The user changes the position of the camera 100 while observing the bar gauges 1003 to 1006 and performs fine adjustment such that the bar gauges 1003 to 1006 are all in the same state. Note that the example display of movement indicators in FIGS. 10A to 10C is illustrative and some embodiments are not limited thereto.

Also, in the present embodiment, completion of position alignment is determined by the visual confirmation and judgement of the user. In view of this, a configuration is adopted in which completion of position alignment is determined using the above degree of deviation. For example, a configuration may be adopted in which it is judged that position alignment is completed if the evaluation value that is based on the degree of deviation decreases to less than or equal to a predetermined value, and the position alignment processing is ended after implementing necessary end processing.

Also, the calibration processing outlined in steps S201 to S207 is described in terms of capturing an image for calculating the lens distortion amount, after completing position alignment. However, a configuration may be adopted in which an image for calculating the lens distortion amount is captured automatically, when it is judged that position alignment is completed using the above-described degree of deviation.

Also, in the first embodiment, the case where lens distortion amounts are stored in the image capturing lens 110 or the image capture control device 130 has been described. These lens distortion amounts are values corresponding to respective lens positions, but these values may, however, actually be discrete values due to restrictions, such as the storage capacity of the image capturing lens 110 or the image capture control device 130. In that case, it is assumed that even a pseudo image obtained through distortion processing will deviate greatly from the captured image, depending on the lens position. In this case, a configuration may be adopted in which the processing for estimating the lens distortion amount from a captured image and chart information described in the first embodiment is executed in parallel. In that case, for example, the degrees of deviation of the captured image respectively with a pseudo image generated from the lens distortion amount stored by the image capturing apparatus 110 or the image capture control device 130 and a pseudo image generated from the estimated lens distortion amount are calculated. The pseudo image with the smaller absolute value of the degree of deviation is then displayed.

Also, the processing for calculating the degree of deviation from a captured image and a pseudo image in step S806 is described above in terms of calculating the degree of deviation in all the grid portions of the chart in the captured image. However, the lens distortion amount tends to increase as the peripheral image height increases (at higher image heights) from the optical center. Thus, the regions in which the degree of deviation is calculated may be limited according to the lens distortion amount or the image height. As a result, it becomes possible to reduce the calculation processing load.

Also, although the pseudo image that is used in this processing of step S806 is an image that has undergone distortion processing, the evaluation value that is based on the degree of deviation is determined from the relative difference in the degree of deviation, and thus a configuration may be adopted in which the degree of deviation is calculated from a captured image and a reference image that has not undergone distortion processing.

Also, in the processing for superimposing the pseudo image on the captured image in step S807, the contents of the superimposition processing may be changed, according to the degree of deviation calculated in step S806. For example, it is conceivable to change the opacity, the color, or the display method, according to the degree of deviation. Specifically, in the case of changing the color, if the display color of the black grid portions of the pseudo image that correspond to the black grid portions of the chart in the captured image is red, the color of grid portions in which the degree of deviation is greater than or equal to a predetermined value is changed to a contrasting color that is easily visible against the display color. In this case, red is changed to a blue color (blue or cyan). This allows the position of portions having a large degree of deviation to be easily recognized, thus further facilitating position alignment. Also, in the case of changing the display method, a configuration may be adopted in which, for example, only the frame portion of grid portions of the pseudo image in which the evaluation value based on the degree of deviation satisfies a predetermined value is displayed. This allows the position of portions having a large degree of deviation to be easily recognized, similarly to the case of changing the color.

As described above, in the present embodiment, the degree of deviation is calculated from a captured image and a pseudo image, and an indicator that is based on the degree of deviation is further superimposed on an image obtained by superimposing the pseudo image on the captured image. It thereby becomes possible to more accurately perform position alignment of the image capturing apparatus and the chart.

Third Embodiment

Next, issues that arise in the calibration processing when position alignment of the chart and the camera is performed visually will be described. Also, a method for instructing the user how much and in which direction to move the camera, and for reducing time and effort by making final fine adjustment with the camera, will be described.

In the case where position alignment of the chart and camera is performed visually, the user may possibly not know how much more to move the camera to achieve a state in which the positions coincide from a state in which the positions do not coincide. Accordingly, the user needs to move the camera while visually checking the match between the captured chart that is being captured and the displayed chart that is being displayed on the LCD. Also, even if the user visually judges that the camera and the chart are matched, there is a possibility that minute misalignment that is not visible on the LCD actually remains. When minute misalignment remains, it is conceivable that lens data that is desirably acquired in the calibration processing cannot be acquired in concentric circles whose origin is the middle of the screen, and there is a possibility that accurate lens information cannot be acquired. Furthermore, when the user puts in the effort on angle-of-view alignment so as to eliminate minute misalignment in order to accurately align the angle of view, the work involved in calibration will be hindered due to the increased time spent on angle-of-view alignment and other factors.

In response to the above issues, a method for instructing the user how much and in which direction to move the camera in order to positionally align the chart and the camera, and for making final fine adjustment with the camera will be described using FIGS. 11 to 19.

FIGS. 11 to 14 are flowcharts for describing processing for positionally aligning the camera in order to perform calibration processing in the present embodiment.

Figure 11:
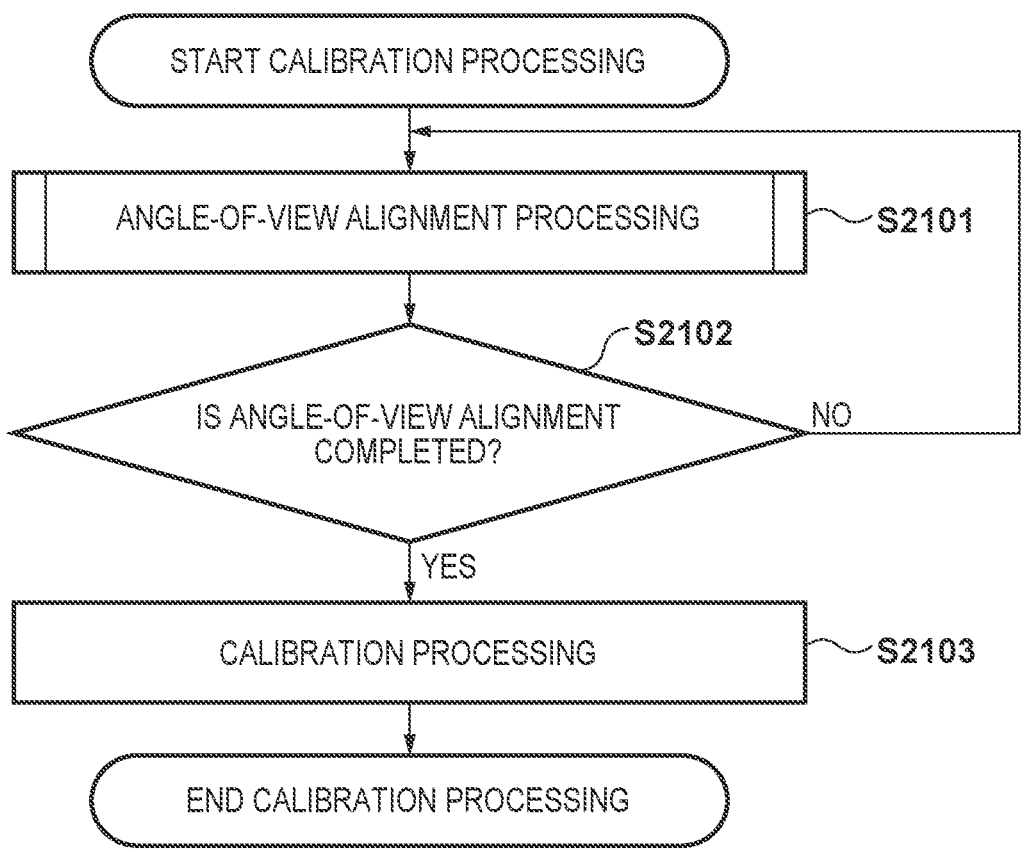
FIG. 11 is a flowchart showing calibration processing in a third embodiment.

FIG. 11 shows the angle-of-view alignment and calibration processing procedures in the calibration processing.

First, when the user changes the camera 100, via the operation unit 142, to a calibration mode for acquiring lens data for VFX compositing, the processing of FIG. 11 is started.

In step S2101, the computing device 136 performs angle-of-view alignment processing and advances the processing to step S2102. The angle-of-view alignment processing will be described in detail later.

In step S2102, the computing device 136 determines whether the angle-of-view alignment processing was completed in step S2101, and, if it is determined that the angle-of-view alignment processing is completed, ends the angle-of-view alignment processing, and advances the processing to step S2103.

Next, in step S2103, the computing device 136 implements calibration processing and ends the processing.

Next, the angle-of-view alignment processing in step S2101 will be described in detail using FIG. 12.

First, in step S2201, the computing device 136 initializes flag information for determining in step S2102 described above whether the angle-of-view alignment processing was completed to a non-completion state.

In step S2202, the computing device 136 reads out model data of the chart recorded in the chart information storage unit 139a. The model data corresponds to a pseudo image or a reference image generated from chart information described in the first and second embodiments.

In step S2203, the computing device 136 calculates a difference representing the amount of misalignment from the model data of the chart read out in step S2202 and an image of the chart captured by the camera. This processing will be described in detail later using FIG. 13.

In step S2204, the computing device 136 calculates the direction in which and by how much the camera 100 should be moved from the misalignment amount calculated in step S2203. This processing will be described in detail later using FIG. 14.

In step S2205, the computing device 136 determines whether the misalignment amount calculated in step S2203 or a movement amount G of the camera 100 calculated in step S2204 based on the misalignment amount is less than a threshold value. If determined to be less than the threshold value, the processing is advanced to step S2206, and if determined to be greater than or equal to the threshold value, the processing is advanced to step S2209.

Step S2206 is performed in the case where the computing device 136 determines in step S2205 that the movement amount G of the camera 100 is less than the threshold value. The case where the movement amount G of the camera 100 is small is processing in the case where it is determined that any further fine adjustment of the camera position with respect to the chart performed manually by the user would be difficult. Accordingly, instead of causing the user to move the camera, center position alignment of the angle of view is implemented inside the camera.

Specifically, the computing device 136 calculates the drive amount of the image stabilization lens 114 based on the difference calculated in step S2203, such that the difference between the chart and the captured image is minimized. The computing device 136 then outputs an instruction to drive the image stabilization lens 114 to the lens control unit 121 via the electrical contact unit 150. The lens control unit 121, having received this instruction, outputs a command to drive the image stabilization lens 114 to the image stabilization drive unit 118, and the image stabilization drive unit 118 actually drives the image stabilization lens 114. Alternatively, the computing device 136 calculates the drive amount of the image stabilization drive unit 134 with respect to the image sensor 131 based on the difference calculated in step S2203, and outputs a command to drive the image sensor 131 to the image stabilization control unit 135. The image stabilization drive unit 134 then actually drives the image sensor 131. Alternatively, both the image stabilization lens 114 and the image sensor 131 described above may be driven. In the case where both of these members are driven, it is desirable to drive these two members to a position at which the data change in the distortion amount is minimized, compared with a state where the lens 110 to 115 and the image sensor 131 are on the optical axis.

Since the computing device 136 has implemented center alignment of the angle of view inside the camera 100 in step S2206, the display control unit 141, in step S2207, performs display on the display unit 140 indicating that the angle-of-view alignment operation by the user is completed.

In step S2208, the computing device 136 turns on a flag indicating that angle-of-view alignment is completed and ends the processing. Note that this flag is used in order to determine in step S2102 whether angle-of-view alignment is completed.

Step S2209 is performed in the case where it is determined that the misalignment amount is greater than or equal to the threshold value in step S2205, and there remains an amount of angle-of-view alignment to be performed by the user. Accordingly, the display control unit 141 performs, on the display unit 140, display indicating that angle-of-view alignment by the user is not completed. As an example, a conceivable method involves displaying the vertical movement amount, the horizontal movement amount, and the movement direction with respect to the chart, out of the movement amount G of the camera 100 calculated in step S2204.

As a result of the above processing, in the case where the camera 100 is greatly misaligned with the chart, the user is able to move the camera 100 after having confirmed the amount and direction of movement of the camera. Also, for minute misalignment that the user is unable to eliminate, the user no longer needs to perform adjustment, and the time spent on angle-of-view alignment for calibration processing is shortened.

Figure 13A:
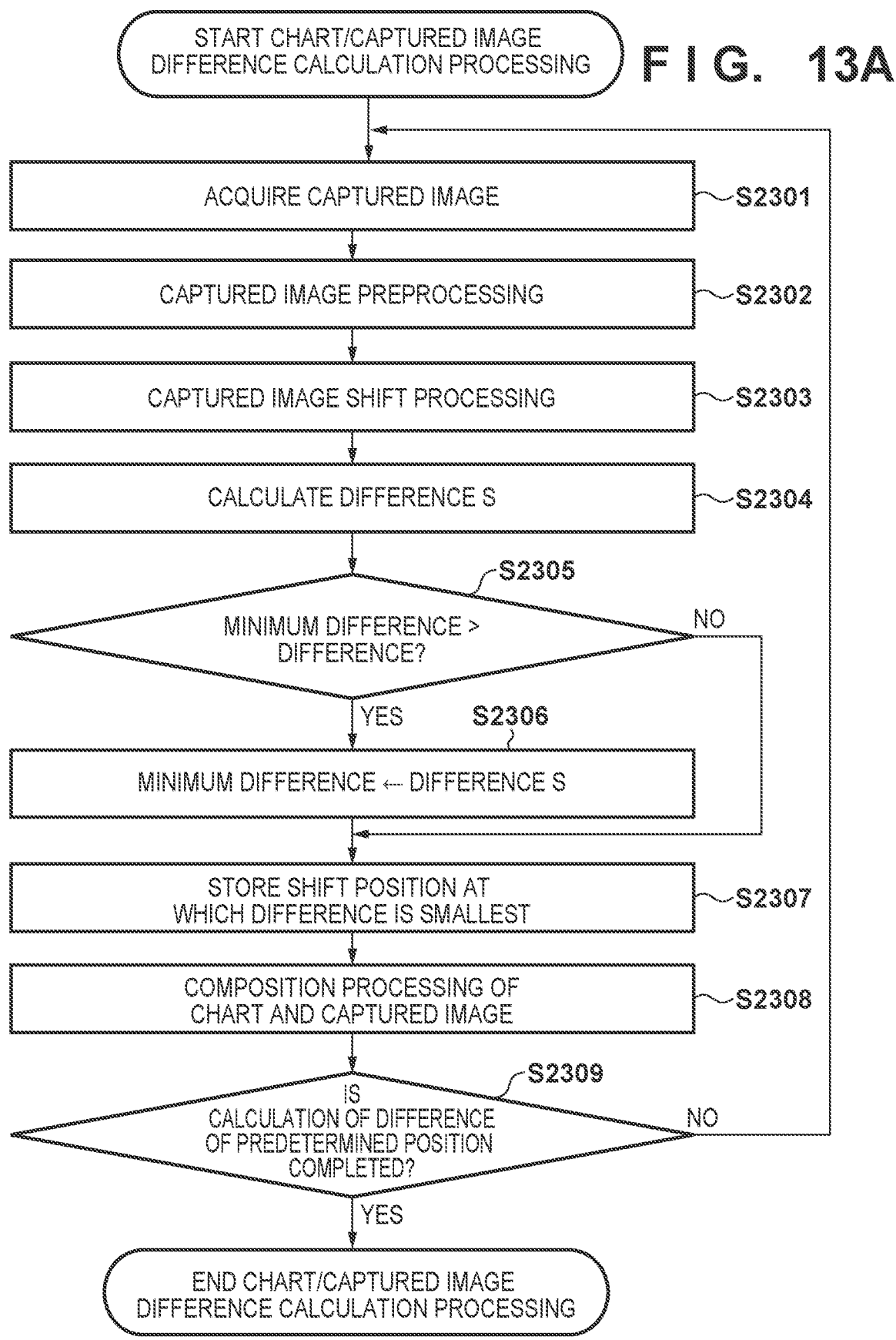
FIG. 13A is a flowchart showing processing for calculating the difference between a chart and a captured image in the third embodiment.

Next, processing for calculating the difference between the chart and the captured image in step S2203 will be described in detail using FIG. 13A.

First, in step S2301, the computing device 136 gives an instruction to the image sensor control unit 133, acquires an image signal obtained by capturing an image of the chart from the image sensor 131 at a predetermined cycle, and sends the acquired image signal to the image processing unit 137. The image processing unit 137 performs appropriate image processing on the image signal and temporarily stores the resultant image signal in the volatile memory 138.

In step S2302, the computing device 136 instructs the image processing unit 137 to perform image processing, such as binarizing the temporarily stored image of the chart, so as to facilitate calculation of the difference in step S2304 described later. Note that processing of the image signal is not limited to binarization.

Next, in step S2303, the computing device 136 performs captured image shift processing on the chart image that has undergone image processing.

Specifically, an example of a method for searching for a position at which the difference from the model data of the chart read out in step S2202 is minimized includes a method of calculating the smallest difference position while changing the comparison position of the captured image and the model data of the chart. The difference is calculated by generating an image in which the chart image is moved N pixels horizontally to the left and N pixels vertically upward. Also, if, as a result of this processing, it is determined in step S2309 described later that the difference calculation of the predetermined position is not completed, the image is moved differently from last time, such as N−1 pixels horizontally to the left and N pixels vertically upward, and the difference of the image is calculated again.

A shift range relating to the range within which to shift the image and a shift step amount relating to the step amount (thinning amount) by which to shift the shift range may be set in the camera or may be provided by the user. In the case of setting these variables in the camera, a conceivable method involves first setting a large shift step amount and searching for a position at which the difference is smallest, and then setting a smaller shift step amount and again searching for a position at which the difference is smallest. In step S2303, the image processing unit 137 changes the above-described shift range by the set shift step amount every time step S2303 is executed, and extracts an image and outputs the extracted image to the computing device 136.

Also, as a further example of a method for searching for a position at which the difference from the model data of the chart read out in step S2202 is smallest, a method such as the following is also conceivable. That is, an image captured while changing the position of the image reduction lens 114 is compared with the model data of the chart each time, and the position of the image stabilization lens 114 at which the difference is smallest is calculated. A specific method will be described later using FIGS. 16A to 16D.

Furthermore, as another example of a method for searching for a position at which the difference from the model data of the chart read out in step S2202 is smallest, a method such as the following is also conceivable. That is, an image captured while changing the position of the image sensor 131 is compared with the model data of the chart each time, and the position of the image sensor 131 at which the difference is smallest is calculated. A specific method will be described later using FIGS. 17A to 17D.

Furthermore, in the case of implementing a method of calculating the smallest difference position while changing the comparison position of the captured image and the model data of the chart, comparison is also possible after having not only changed the shift position horizontally and vertically but also having changed the position in the rotation direction.

Only one of the method of changing the comparison position and a rotation amount r of the captured image and the model data of the chart, the method of changing the position of the image stabilization lens 114, and the method of changing the position of the image sensor 131 described above may be implemented or a plurality of these methods may be implemented in combination.

Next, in step S2304, the computing device 136 compares the image captured and generated in step S2303 with the model data of the chart, and calculates a difference S. An example of the calculation method of the difference S will be described using FIG. 19.

Figure 19:
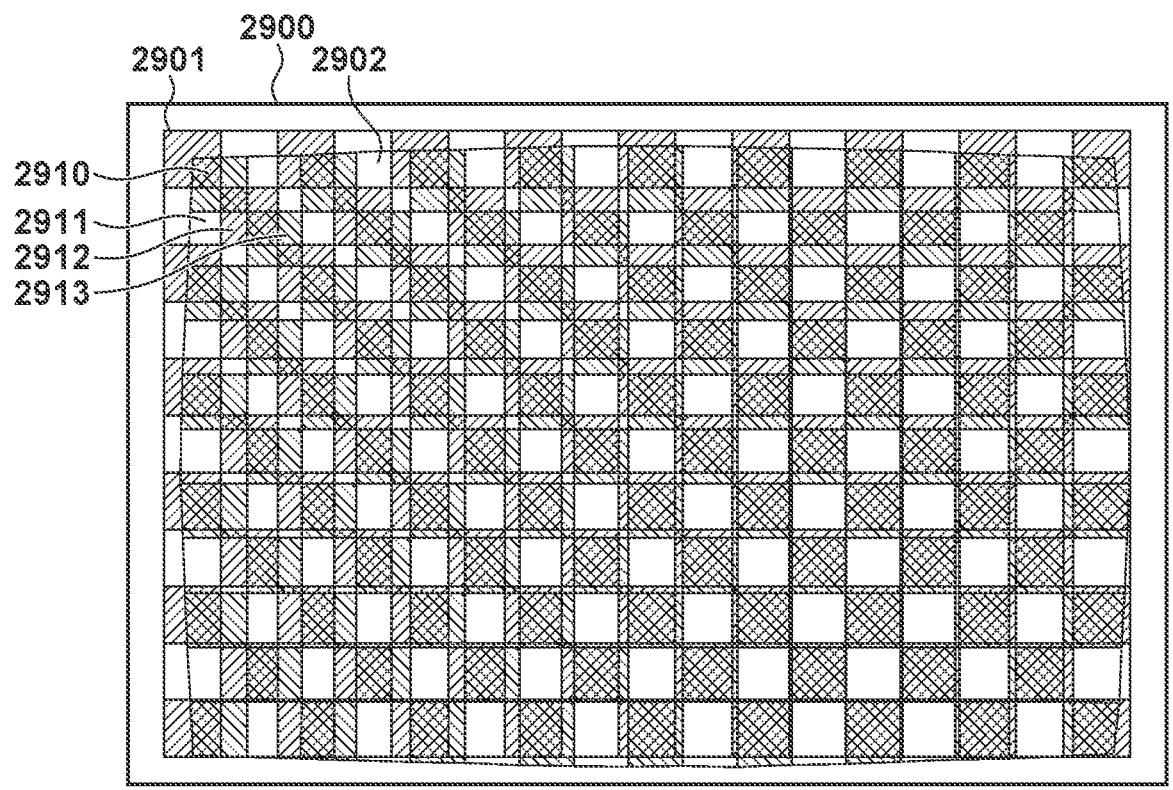
FIG. 19 is a diagram illustrating processing for calculating the difference between a chart and a captured image in the third embodiment.

Reference numeral 2900 in FIG. 19 denotes a region representing the angle of view, reference numeral 2901 denotes the model data of the chart, and reference numeral 2902 denotes the region of the chart in the captured image. Also, the region indicated by reference numeral 2910 (region where upward hatching overlaps with downward hatching) is a region where a black portion of the model data 2901 of the chart overlaps a black portion of the captured image 2902, and is a portion calculated as a region without difference. Similarly, the region (blank region) indicated by reference numeral 2911 is a region where a white portion of the model data 2901 of the chart overlaps a white portion of the captured image 2902, and is a portion calculated as a region without difference. The region indicated by reference numeral 2912 (region with only upward hatching) is a region where a black portion of the model data 2901 of the chart overlaps a white portion of the captured image 2902, and is a portion calculated as a difference region. Similarly, the region indicated by reference numeral 2913 (region with only downward hatching) is a region where a white portion of the model data 2901 of the chart overlaps a black portion of the captured image 2902, and is a portion calculated as a difference region.

Note that, in the above description, difference regions are calculated based on whether or not the colors are the same, but a method may be used in which an identifier, such as an ID, is provided to each grid portion of the chart, and difference regions are calculated by whether same color regions having the same ID overlap.

Next, in step S2305, the computing device 136 compares the area of each difference region calculated by the aforementioned technique with the saved smallest difference value. The computing device 136 advances the processing to step S2306, if the difference S is smaller than the smallest difference value, and advances the processing to step S2309, if the difference S is greater than or equal to the smallest difference value.

In step S2306, the computing device 136 resaves the difference S as the smallest difference value.

In step S2307, the computing device 136 stores the shift position at which the difference S is smallest. Specifically, the computing device 136 stores a pixel movement amount p of the chart image, a drive amount ω of the image stabilization lens 114, and a movement amount i of the image sensor 131 when the difference is smallest as the shift amount.

In step S2308, the computing device 136 instructs the display control unit 141 to perform processing for compositing the model data of the chart and the captured image and to display the composite image on the display unit 140. The user visually observes misalignment between the model data of the chart and the captured image displayed on the display unit 140, and moves the camera so as to correct the misalignment.

In step S2309, the computing device 136 determines whether searching of all search locations that should be searched in step S2303 has ended. The computing device 136 then ends the processing if it is determined that all searching has ended, and returns the processing to step S2301 if it is determined that there remain search locations that should be searched.

As a result of the above processing, it becomes possible to calculate the misalignment amount for deriving the difference between the chart and the camera from the difference between the model data of the chart and the captured image of the chart.

Figure 14:
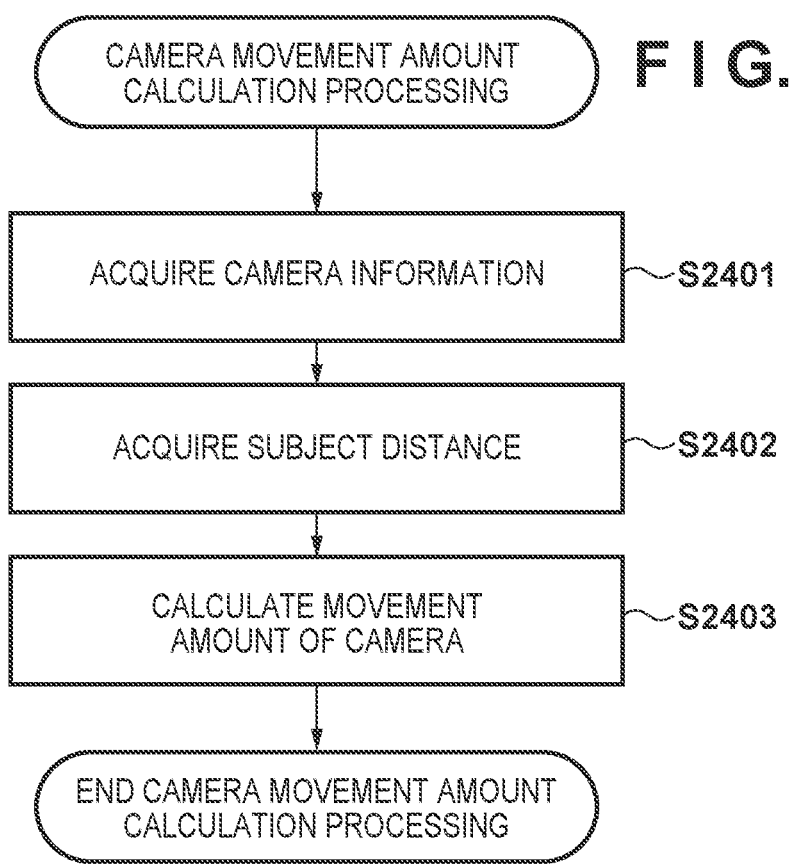
FIG. 14 is a flowchart showing processing for calculating a camera movement amount in the third embodiment.

Next, the camera movement calculation processing of step S2204 will be described in detail using FIG. 14.

First, in step S2401, the computing device 136 performs transmission and reception of commands with the lens control unit 121, and acquires focal length information f of the lens and the drive amount ω of the image stabilization lens 114. Also, the computing device 136 acquires position information of the focusing lens 115, information relating to the drive state of the various lenses, and information relating to the state of the diaphragm 113.

In step S2402, the computing device 136 acquires subject distance information d. The subject distance information d may be calculated from the position information of the focusing lens 115 described above after focusing on the chart, or the subject distance information d may be acquired through input by the user. Alternatively, in the case where the image sensor 131 is an image sensor capable of calculating the defocus amount with an image plane phase detection method, the subject distance information d may be calculated from the position information of the focusing lens 115 described above and the defocus amount.

Figure 12:
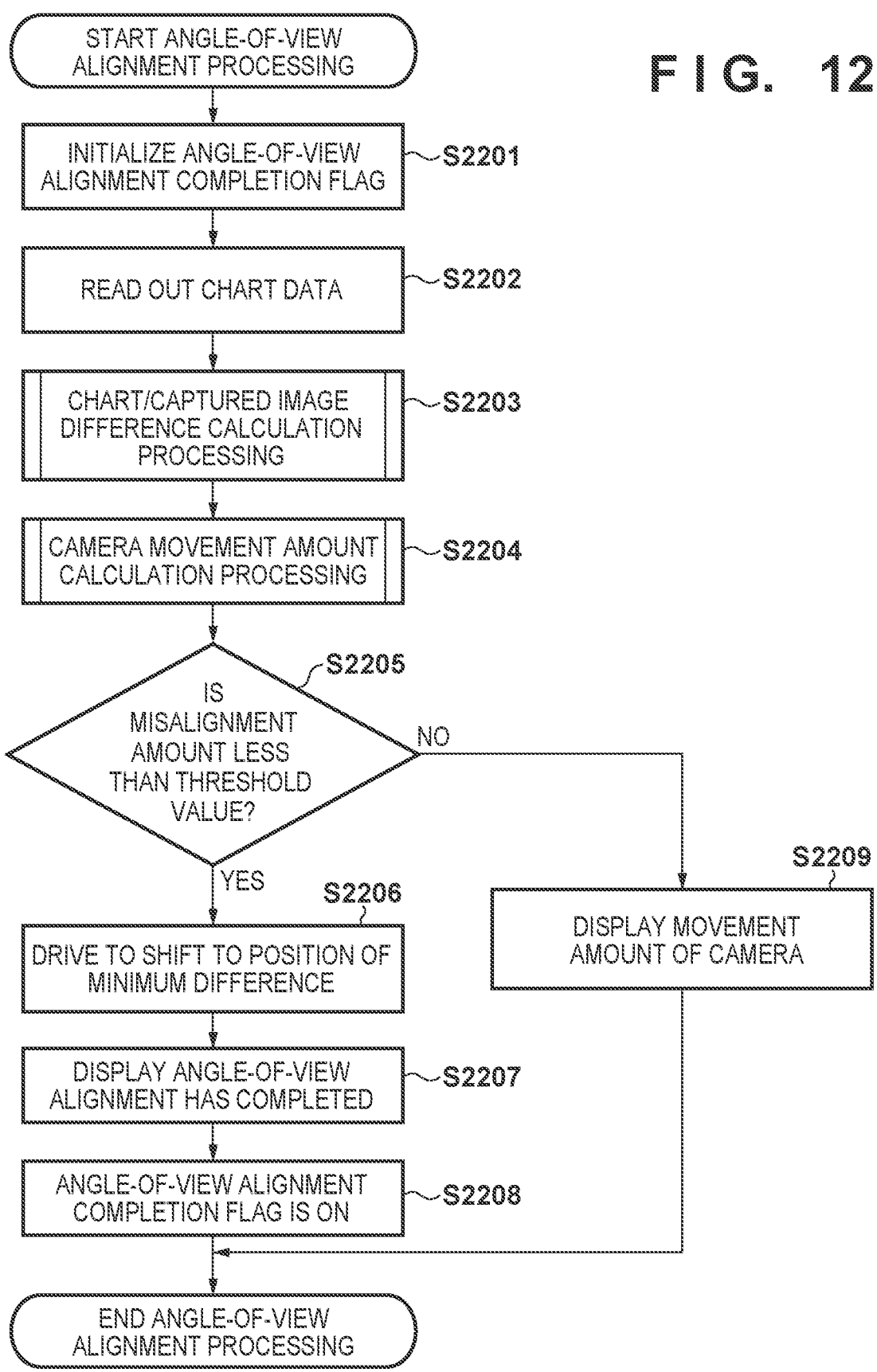
FIG. 12 is a flowchart showing angle-of-view alignment processing in the third embodiment.

In step S2403, the computing device 136 calculates the movement amount G, which is the amount by which to move the camera 100 and the rotation amount, using the acquired subject distance information d and focal length information f of the lens, and the pixel movement amount p, the rotation amount r, the drive amount ω of the image stabilization lens 114 and the movement amount i of the image sensor 131 that are calculated in the angle-of-view alignment processing of FIG. 12, and ends the processing.

Next, an example of calculating the movement amount G of the camera 100 in the captured image shift processing in step S2303 of FIG. 13A will be described. FIGS. 15A to 15D show the case where the shift processing is performed by virtual image movement inside the camera 100 and the movement amount G is calculated. FIGS. 16A to 16D show the case where the shift processing is performed with the image stabilization lens 114 and the movement amount G is calculated. FIGS. 17A to 17D show the case where the shift processing is performed with the image sensor 131 and the movement amount G is calculated. Note that, in the diagrams, configurations that are the same or similar are given the same reference numerals, and redundant description will be omitted.

Figure 15A:
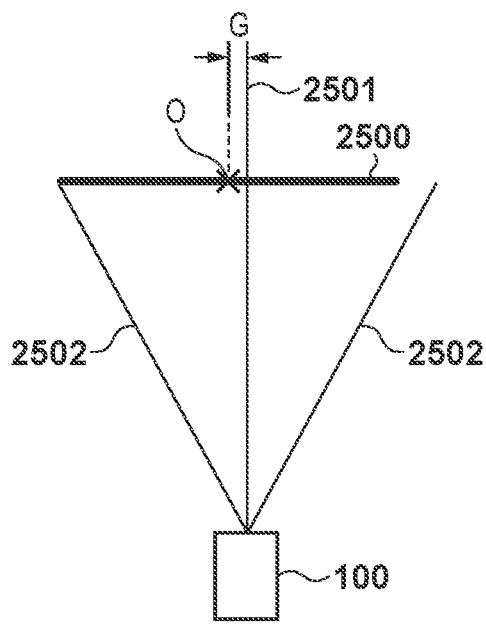
FIGS. 15A to 15D are diagrams illustrating calculation of a camera movement amount in the third embodiment.

In FIG. 15A, reference numeral 2500 denotes the chart that is used in calibration, and a point O denotes the middle position of the chart. Reference numeral 2501 denotes the optical axis of the camera 100. Reference numeral 2502 denotes the angle of view of the camera 100. One object of the present embodiment is to calculate the deviation distance G between the point O and the optical axis 2501 and present the deviation distance (movement amount) G to the user.

Figure 15B:
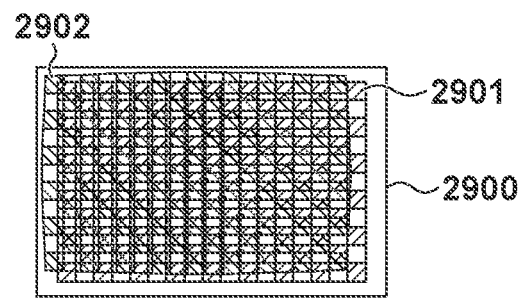

FIG. 15B shows display on an LCD screen when image capture is performed in the situation of FIG. 15A.

The model data 2901 of the chart that serves as the target for aligning the image with the angle of view 2900 is displayed in the middle of the screen. Also, in FIG. 15A, the camera 100 is slightly misaligned to the right with respect to the chart 2500, and thus, in FIG. 15B, the chart 2902 in the captured image is composited in a slightly misaligned manner to the left.

Figure 15C:
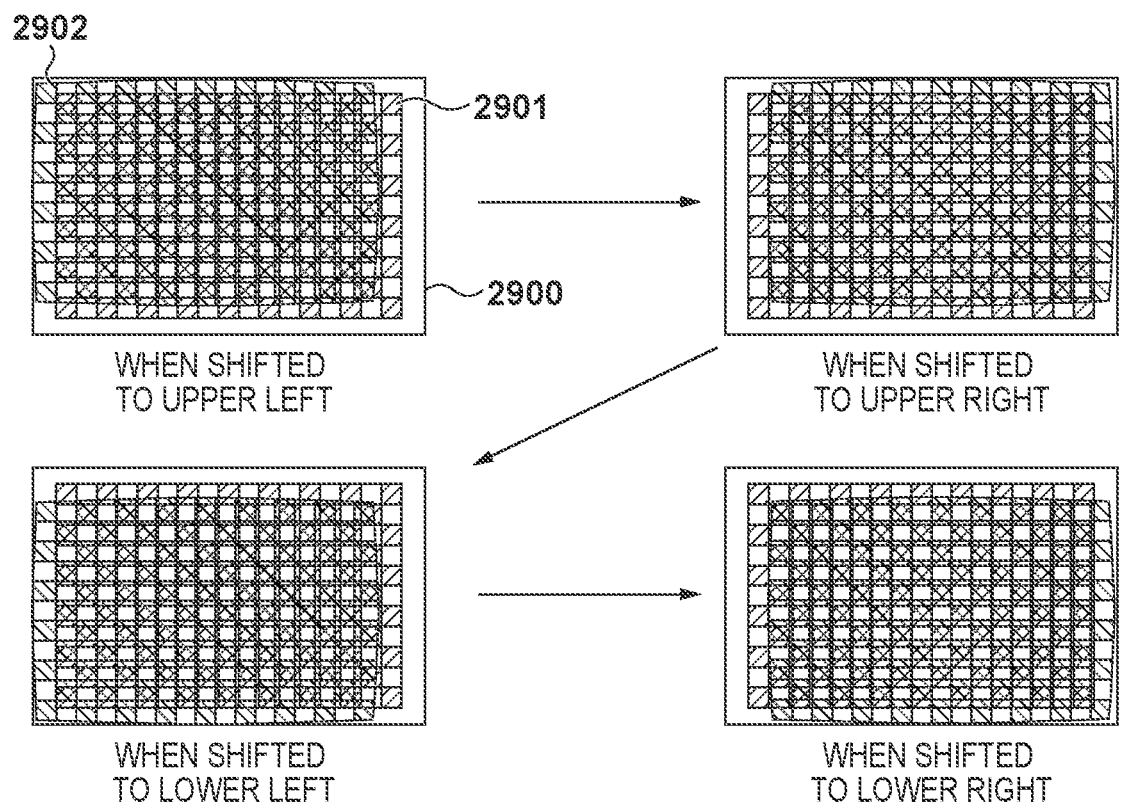
Figure 15D:
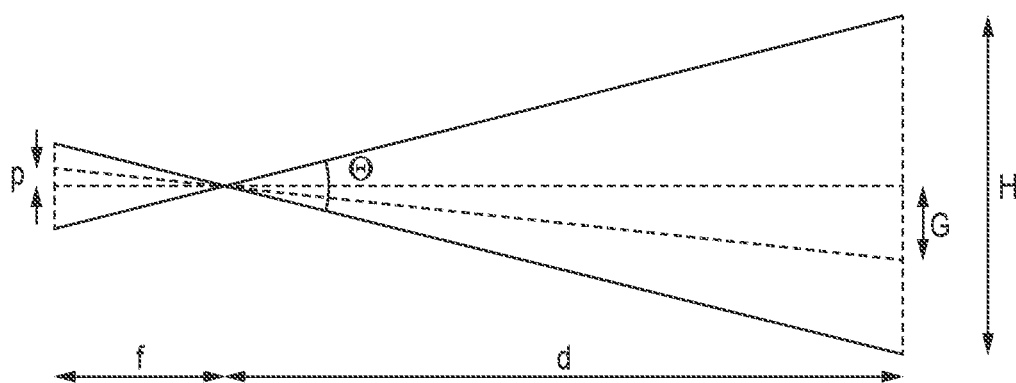

FIG. 15C is a diagram illustrating an example of captured image shift processing that is implemented each time in step S2303. If the captured image is not shifted, misalignment such as is shown in FIG. 15B will occur, and, in the first iteration of the processing of step S2303, the captured image is virtually shifted in the upper left direction and composited with the model data of the chart, resulting in misalignment such as is shown in the upper left diagram of FIG. 15C. The difference is calculated in this state and compared with the smallest difference value, and the smallest difference value and the shift amount that minimizes the difference are updated if necessary.

Next, as the second iteration of the processing, the captured image is virtually shifted in the upper right direction and is composited with the model data of the chart, resulting in misalignment such as is shown in the upper right diagram of FIG. 15C. The difference is calculated in this state and compared with the smallest difference value, and the smallest difference value and the shift amount that minimizes the difference are updated if necessary.

Next, as the third iteration of the processing, the captured image is virtually shifted in the lower left direction and is composited with the model data of the chart, resulting in misalignment such as is shown in the lower left diagram of FIG. 15C. The difference is calculated in this state and compared with the smallest difference value, and the smallest difference value and the shift amount that minimizes the difference are updated if necessary.

Next, as the fourth iteration of the processing, the captured image is virtually shifted in the lower right direction and composited with the model data of the chart, resulting in misalignment such as is shown in the lower right diagram of FIG. 15C. The difference is calculated in this state and compared with the smallest difference value, and the smallest difference value and the shift amount that minimizes the difference are updated if necessary.

The above processing is performed, and the deviation distance G is calculated, with the pixel movement amount corresponding to the recorded smallest difference value as p. The deviation distance G can be derived with the following equation from the relationship in FIG. 15D.

$$G=(d \times p)/f$$

Next, a method of calculating the deviation distance G by driving the image stabilization lens 114 will be described using FIGS. 16A to 16D.

Figure 16A:
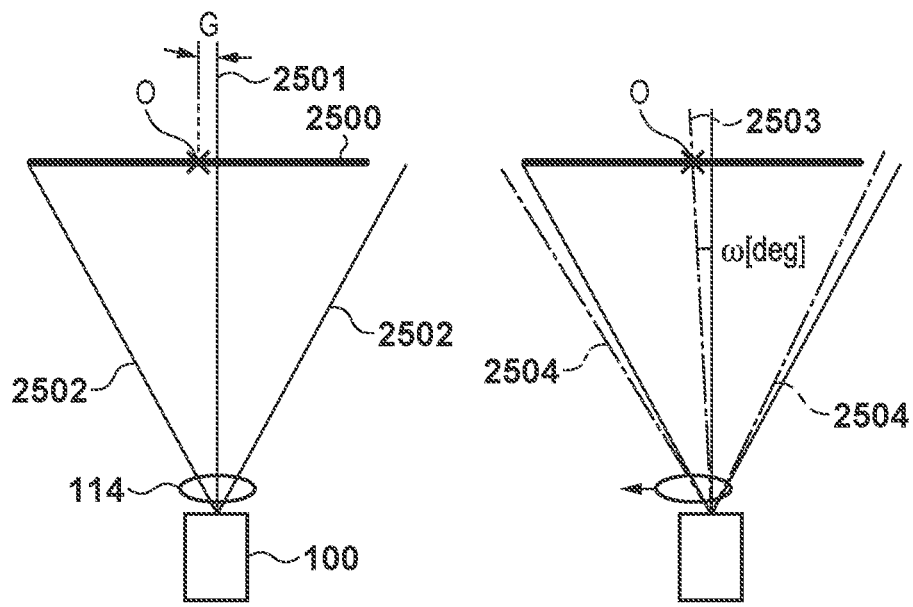
FIGS. 16A to 16D are diagrams illustrating calculation of a camera movement amount in the third embodiment.

In FIG. 16A, reference numeral 2503 denotes the optical axis when the image stabilization lens 114 has moved. As an example, a pattern is illustrated in which the optical axis 2503 passes through the point O, and the correction angle at that time is ω deg. Also, reference numeral 2504 denotes lines representing the changed angle of view in the case where the image stabilization lens 114 has moved.

Figure 16B:
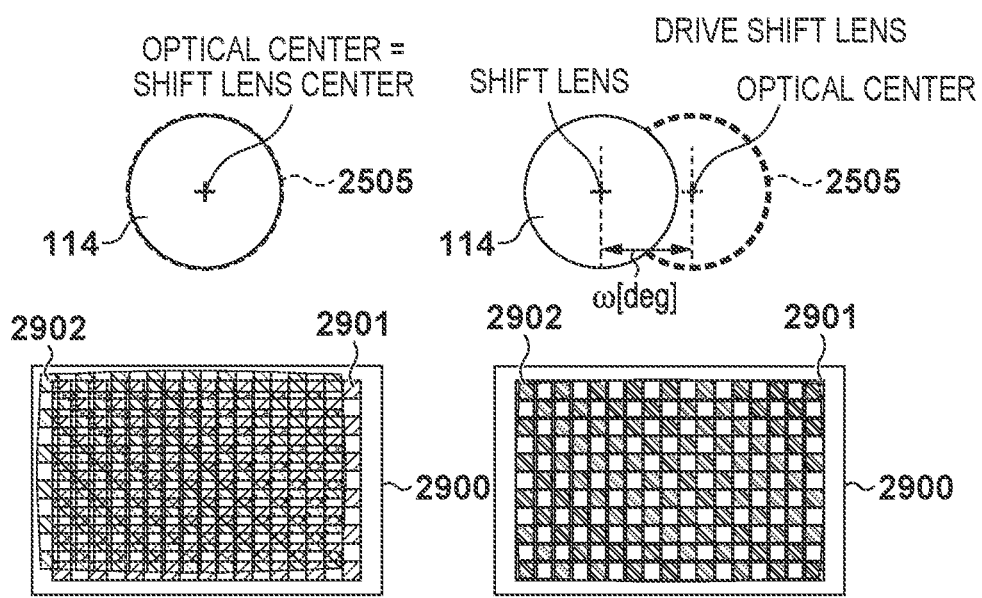

FIG. 16B illustrates the image stabilization lens 114 being driven when image capture is performed in the situation of FIG. 16A. The left diagram of FIG. 16B shows a situation in which the image stabilization lens 114 is holding the center 2505 of the optical axis. On the other hand, the right diagram of FIG. 16B shows a situation in which the image stabilization lens 114 was shifted in the left direction by ω deg with respect to the center 2505 of the optical axis. The lower diagrams of FIG. 16B show display on the LCD screen when image capture is performed in the above situation.

The model data 2901 of the chart that serves as the target for aligning the image with the angle of view 2900 is displayed in the middle of the screen. Also, in the left diagrams of FIGS. 16A and 16B, the camera 100 is slightly misaligned to the right with respect to the chart 2500, and thus the chart 2902 in the captured image is composited in a slightly misaligned manner to the left. On the other hand, in the right diagrams of FIGS. 16A and 16B, the optical axis 2503 of the camera 100 passes through the point O, and thus the center of the chart 2902 in the captured image matches the center of the model data 2901 of the chart.

Figure 16C:
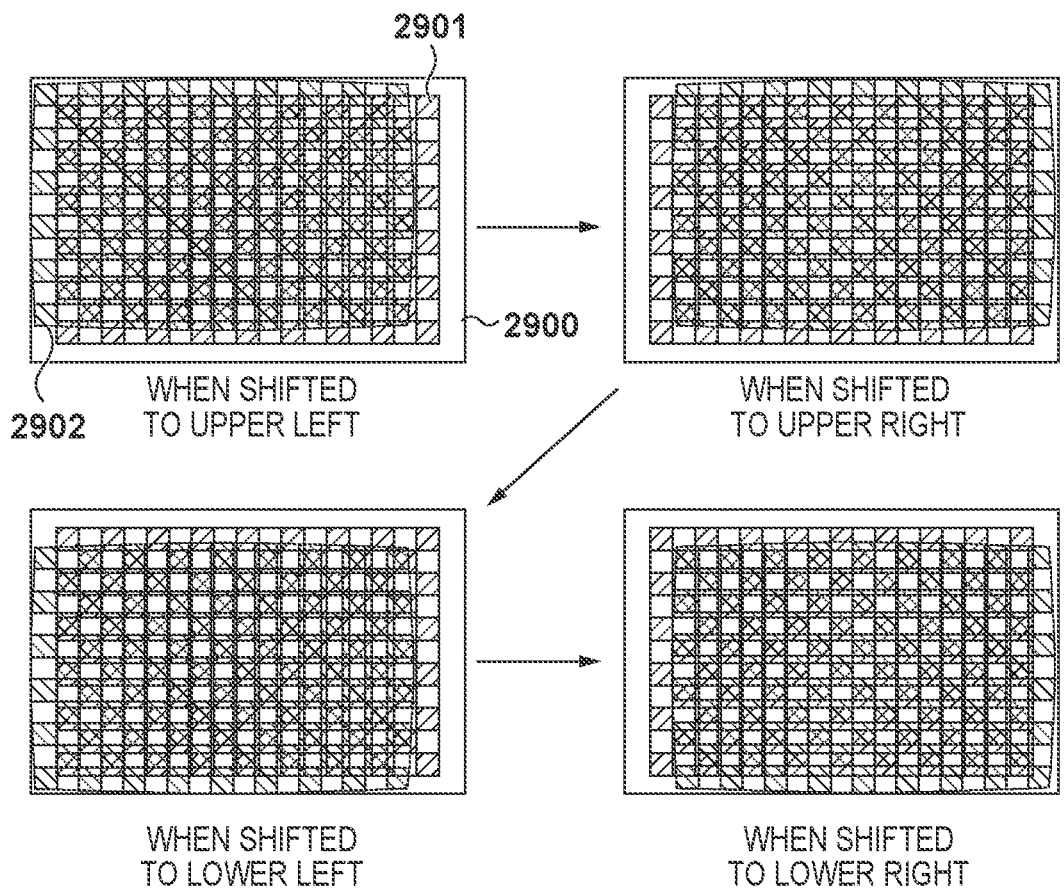
Figure 16D:
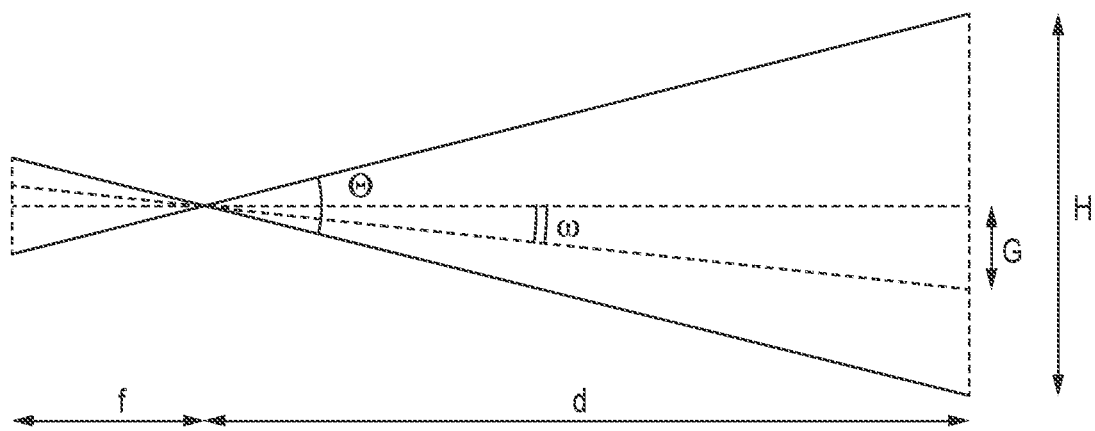

FIG. 16C is a diagram illustrating an example of captured image shift processing that is implemented each time in step S2303. If the image stabilization lens 114 is not shifted, misalignment such as is shown in the left diagram of FIG. 16B will occur, and, in the first iteration of the processing of step S2303, the captured image is shifted in the upper left direction and composited with the model data of the chart, resulting in misalignment such as is shown in the upper left diagram of FIG. 16C. The difference is calculated in this state and compared with the smallest difference value, and the smallest difference value and the shift amount of the image stabilization lens 114 that minimizes the difference are updated if necessary.

Next, as the second iteration of the processing, the captured image is shifted in the upper right direction and composited with the model data of the chart, resulting in misalignment such as is shown in the upper right diagram of FIG. 16C. The difference is calculated in this state and compared with the smallest difference value, and the smallest difference value and the shift amount of the image stabilization lens 114 that minimizes the difference are updated if necessary.

Next, as the third iteration of the processing, the captured image is shifted in the lower left direction and composited with the model data of the chart, resulting in misalignment such as is shown in the lower left diagram of FIG. 16C. The difference is calculated in this state and compared with the smallest difference value, and the smallest difference value and the shift amount of the image stabilization lens 114 that minimizes the difference are updated if necessary.

Next, as the fourth iteration of the processing, the captured image is shifted in the lower right direction and composited with the model data of the chart, resulting in misalignment such as is shown in the lower right diagram of FIG. 16C. The difference is calculated in this state and compared with the smallest difference value, and the smallest difference value and the shift amount of the image stabilization lens 114 that minimizes the difference are updated if necessary.

The above processing is performed, and the deviation distance G is calculated, with the drive amount of the image stabilization lens 114 corresponding to the recorded smallest difference value as ω. The deviation distance G can be derived with the following equation from the relationship in FIG. 16D.

$$G = d \cdot \tan \omega$$

Note that, in the above-described method of driving the image stabilization lens 114, the image that is actually captured moves in conjunction with driving of the image stabilization lens 114, unlike the aforementioned method of virtually shifting the captured image inside the camera. If the user tries to align the camera with the center of the chart when the captured image moves, it is conceivably difficult to align the camera with the center, even if the movement direction and movement distance are displayed. Accordingly, in the case of calculating the difference by driving the image stabilization lens 114, composite processing in step S2308 is only performed on the image in the case where the image stabilization lens 114 is at the optical center. Alternatively, the difficulty that the user has in positionally aligning the camera is avoided, by performing composite processing with an image obtained by virtually restoring the captured image by an amount equivalent to how much the image stabilization lens 114 was shifted.

Next, a method of calculating the deviation distance G by driving the image sensor 131 will be described using FIGS. 17A to 17D.

Figure 17A:
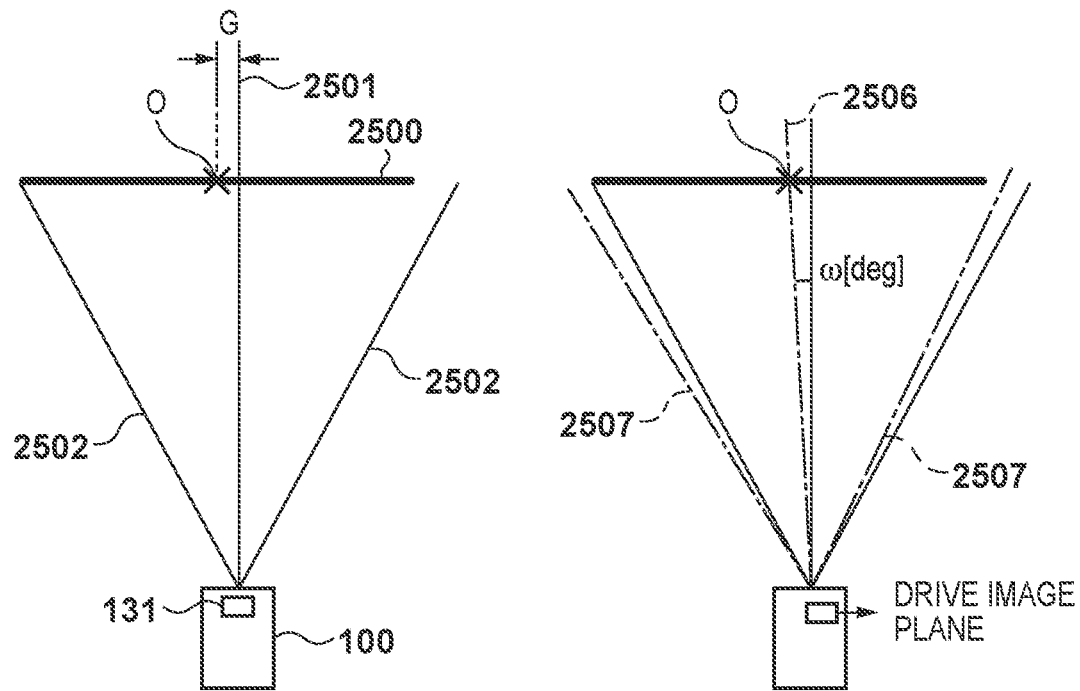
FIGS. 17A to 17D are diagrams illustrating calculation of a camera movement amount in the third embodiment.

In FIG. 17A, reference numeral 2506 denotes the optical axis when the image sensor 131 has moved. As an example, a pattern is illustrated in which the optical axis 2506 passes through the point O, and the correction amount of the image sensor 131 at that time is i mm. Also, reference numeral 2507 denotes the changed angle of view in the case where the image sensor 131 has moved.

Figure 17B:
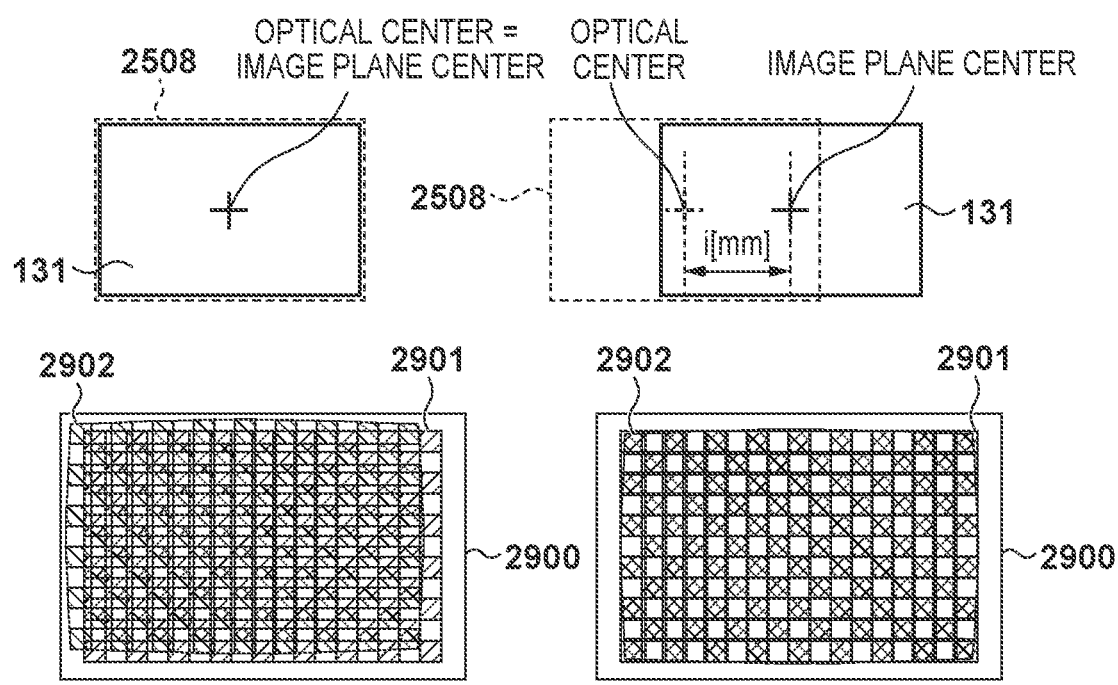

FIG. 17B illustrates the image sensor 131 being driven when image capture is performed in the situation of FIG. 17A. The left diagram of FIG. 17B shows a situation in which the image sensor 131 is holding a center 2508 of the optical axis. On the other hand, the right diagram of FIG. 17B shows a situation in which the image sensor 131 is shifted in the right direction by i mm with respect to the center 2508 of the optical axis. Also, the lower diagrams of FIG. 17B show displays on the LCD screen when image capture is performed in the above situation.

The model data 2901 of the chart that serves as the target for aligning the image with the angle of view 2900 is displayed in the middle of the screen. Also, in the left diagrams of FIGS. 17A and 17B, the camera 100 is slightly misaligned to the right with respect to the chart 2500, and thus the chart 2902 in the captured image is composited in a slightly misaligned manner to the left. On the other hand, in the right diagrams of FIGS. 17A and 17B, the optical axis 2506 of the camera 100 passes through the point O, and thus the center of the chart 2902 in the captured image matches the center of the model data 2901 of the chart.

Figure 17C:
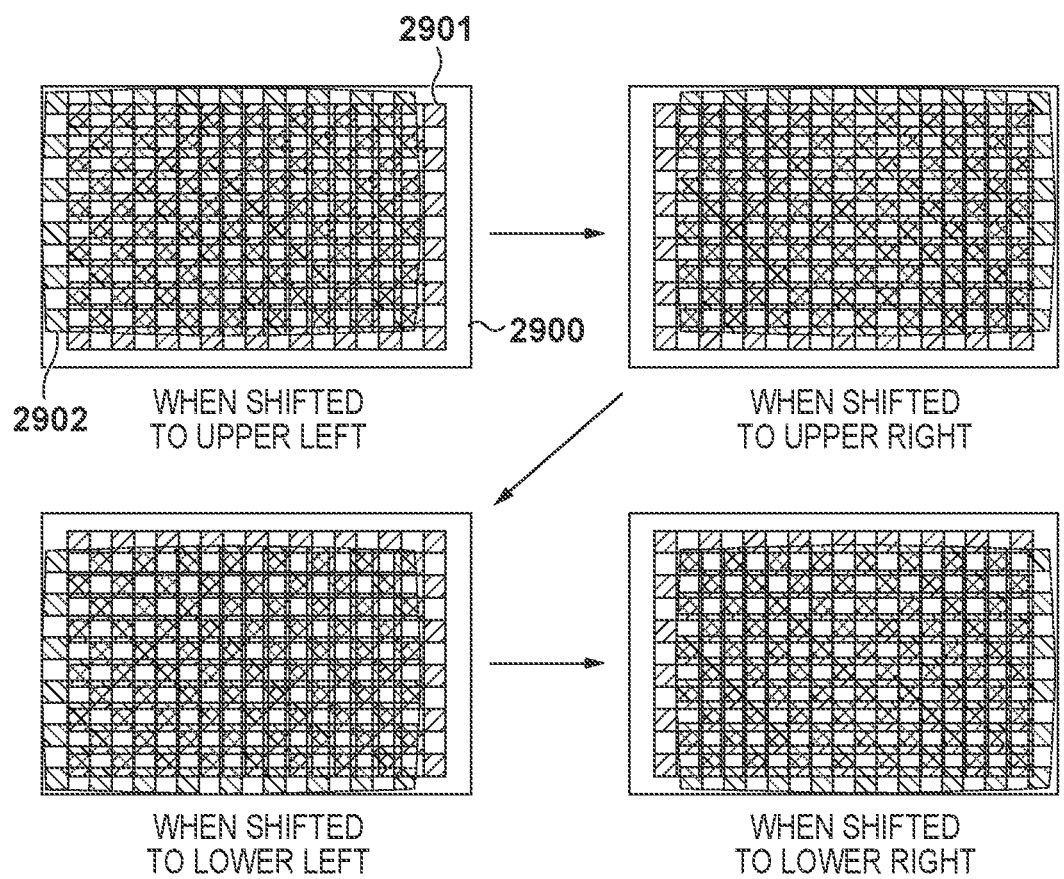
Figure 17D:
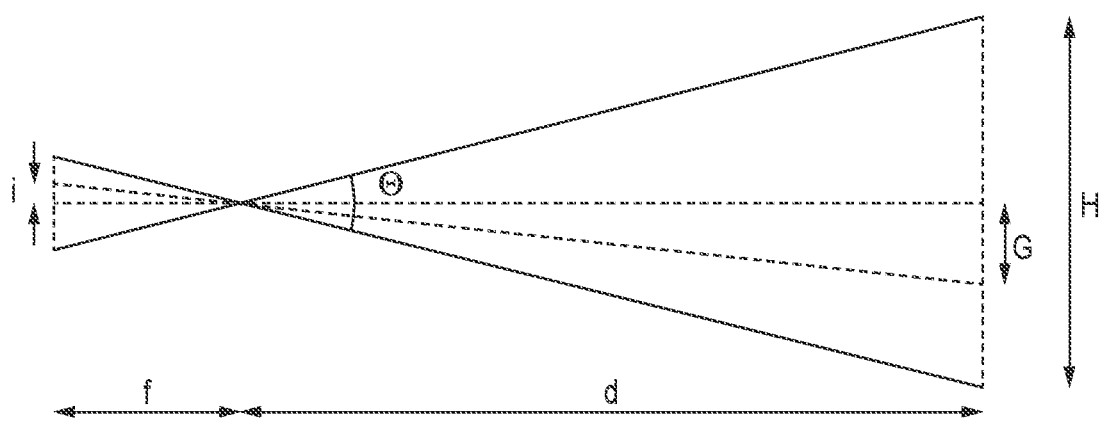

FIG. 17C is a diagram showing an example of the captured image shift processing that is implemented each time in step S2303. If the image sensor 131 is not shifted, misalignment such as is shown in the left diagram of FIG. 17B will occur, and, in the first iteration of the processing of step S2303, the captured image is shifted in the upper left direction and composited with the model data of the chart, resulting in misalignment such as is shown in the upper left diagram of FIG. 17C. The difference is calculated in this state and compared with the smallest difference value, and the smallest difference value and the shift amount of the image sensor 131 that minimizes the difference are updated if necessary.

Next, as the second iteration of the processing, the captured image is shifted in the upper right direction and composited with the model data of the chart, resulting in misalignment such as is shown in the upper right diagram of FIG. 17C. The difference is calculated in this state and compared with the smallest difference value, and the smallest difference value and the shift amount of the image sensor 131 that minimizes the difference are updated if necessary.

Next, as the third iteration of the processing, the captured image is shifted in the lower left direction and composited with the model data of the chart, resulting in misalignment such as is shown in the lower left diagram of FIG. 17C. The difference is calculated in this state and compared with the smallest difference value, and the smallest difference value and the shift amount of the image capturing element 131 that minimizes the difference are updated if necessary.

Next, as the fourth iteration of the processing, the captured image is shifted in the lower right direction and composited with the model data of the chart, resulting in misalignment such as is shown in the lower right diagram of FIG. 17C. The difference is calculated in this state and compared with the smallest difference value, and the smallest difference value and the shift amount of the image sensor 131 that minimizes the difference are updated if necessary.

The above processing is performed, and the deviation distance G is calculated, with the drive amount of the image sensor 131 corresponding to the recorded minimum differential value as i. The deviation distance G can be derived with the following equation from the relationship in FIG. 17D.

$$G=(d\times i)/f$$

Note that, in the above-described method of driving the image sensor 131, the image actually captured moves in conjunction with driving of the image sensor 131, unlike the aforementioned method of virtually shifting the captured image inside the camera. If the user tries to align the camera with the center of the chart when the captured image moves, it is conceivably difficult to align the camera with the center, even if the movement direction and movement distance are displayed. Accordingly, in the case of calculating the difference by driving the image sensor 131, the composite processing in step S2308 is only performed on the image in the case where the image sensor 131 is at the optical center. Alternatively, the difficulty that the user has in positionally aligning the camera is avoided, by performing composite processing with an image obtained by virtually restoring the captured image by an amount equivalent to how much the image sensor 131 was shifted.

By performing the above processing, the deviation distance G between the camera and the middle of the chart is derived, and the movement amount of camera can be notified to the user. Thus, it becomes possible to reduce the time and effort of angle-of-view alignment for calibration processing.

Note that, in order to facilitate understanding, shifting is described above as being performed four times, but shifting may actually be implemented more than four times.

Next, an example of a method of displaying the movement amount G (vertical/horizontal movement amount and movement direction) of the camera 100 until angle-of-view alignment by the user is completed in steps S2209 and S2207 will be described using FIGS. 18A and 18B.

Figure 18A:
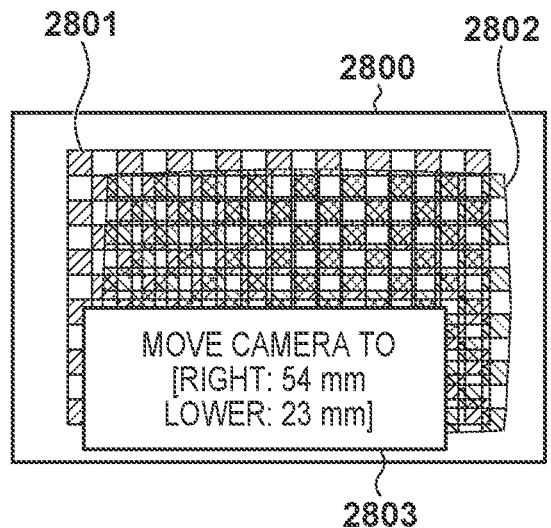
FIGS. 18A and 18B are diagrams illustrating camera display during and after completion of angle-of-view alignment in the third embodiment.

FIG. 18A shows a display on the display unit 140 in the case where it is determined that the amount of misalignment between the camera 100 and the calibration chart is greater than or equal to a threshold value.

Reference numeral 2800 in FIG. 18A denotes a region representing the angle of view, reference numeral 2801 denotes the model data of the chart, and reference numeral 2802 denotes the region of the chart in the captured image. In FIG. 18A, the amount of misalignment between the camera 100 and the chart is greater than or equal to the threshold value, and thus the chart 2802 in the captured image is displayed at a position misaligned from the model data 2801 of the chart. Also, reference numeral 2803 denotes a display example in which the movement amount and movement direction of the camera are instructed to the user in the case where it is determined that the amount of misalignment between the camera 100 and the chart in the captured image is greater than or equal to the threshold value (greater than or equal to a predetermined value). The display 2803 indicates that the centers of the positions of the model data 2801 of the chart and the chart 2802 in the captured image will coincide when the camera is moved 54 mm to the right and 23 mm down.

Figure 18B:
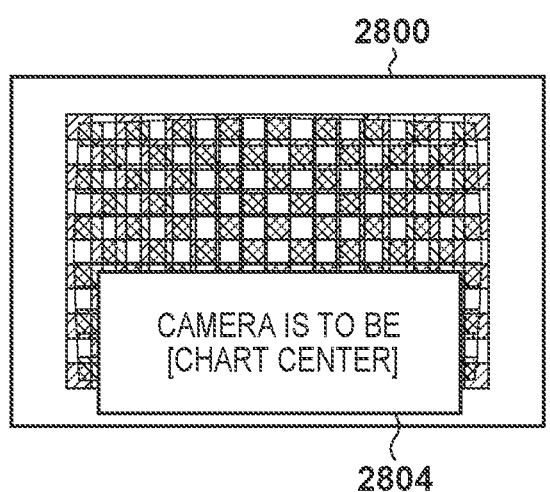

FIG. 18B shows a display on the display unit 140 in the case where it is determined that the amount of misalignment between the camera 100 and the chart is less than the threshold value.

Display 2804 in FIG. 18B indicates that misalignment between the camera 100 and the captured chart has been eliminated. The user ends position movement of the camera, based on the display 2804. On the other hand, it is rare that misalignment between the camera 100 and the captured chart is completely eliminated, and thus, as aforementioned in step S2206, the image stabilization lens 114 or the image sensor 131 is driven (shifted) to a position at which the difference is smallest. The difference between the model data 2801 of the chart and the region 2802 of the chart in the captured image is thereby minimized, and position alignment of the camera 100 can be completed without the user performing minute position alignment.

Using the technique described above makes it easier for the user to comprehend in which direction and by how much to move the camera, compared to the case of positionally aligning the chart and the camera visually, and thus the time spent on position alignment is reduced.

Furthermore, even in the case where minute misalignment that is not visible on the LCD remains, further reduction in time spent on position alignment is realized, due to misalignment being corrected by driving the image stabilization lens 114 or the image sensor 131.

Note that the chart pattern is not limited to a format such as described above, and may be any pattern in which the horizontal and vertical directions of the chart are represented at predetermined intervals. For example, the chart may be a checkered pattern in which adjacent black and white rectangles are alternated in a rectangular region divided into a grid shape, or it may be a barcode-like pattern.

Furthermore, as aforementioned in the first embodiment, display or difference calculation may be performed after having distorted the model data of the chart based on the distortion amount and tilt-shift amount that are provisionally calculated from the captured image.

Furthermore, display or difference calculation may be performed after changing the magnification ratio of the model data of the chart according to the focal length.

Fourth Embodiment

The case where the camera 100 is greatly out of alignment with the chart 2500, and the movement amount G of the camera cannot be calculated with only one of the methods involving virtually moving the image, moving the image stabilization lens 114, and moving the image sensor 131, in the processing for calculating the difference between the chart and the captured image in FIG. 13A, will be described using FIG. 13B. Note that, in FIG. 13B, processing that is the same as FIG. 13A is given the same step numerals and description thereof will be omitted.

In the case where it is determined, as a result of executing the processing of steps S2301 to S2309, that the shift position at which the difference value is smallest is located at the edge of the range in which the search was executed, there is a possibility that the shift position at which the difference value is smallest is outside of the search range.

Accordingly, processing is performed with the following pattern in order to further expand the search range.

In the case where shift processing by image movement is performed in the captured image shift processing of step S2303, the search range is expanded by driving either the image stabilization lens 114 or the image sensor 131 to a position at which the image shifts in the direction in which the difference is smallest.

Also, in the case where shift processing using the image stabilization lens 114 is performed in the captured image shift processing of step S2303, the search range is expanded by driving the image sensor 131 to a position at which the image shifts in the direction in which the difference is smallest.

Also, in the case where shift processing using the image sensor 131 is performed in the captured image shift processing of step S2303, the search range is expanded by driving the image stabilization lens 114 to a position at which the image shifts in the direction in which the difference is smallest.

Figure 13B:
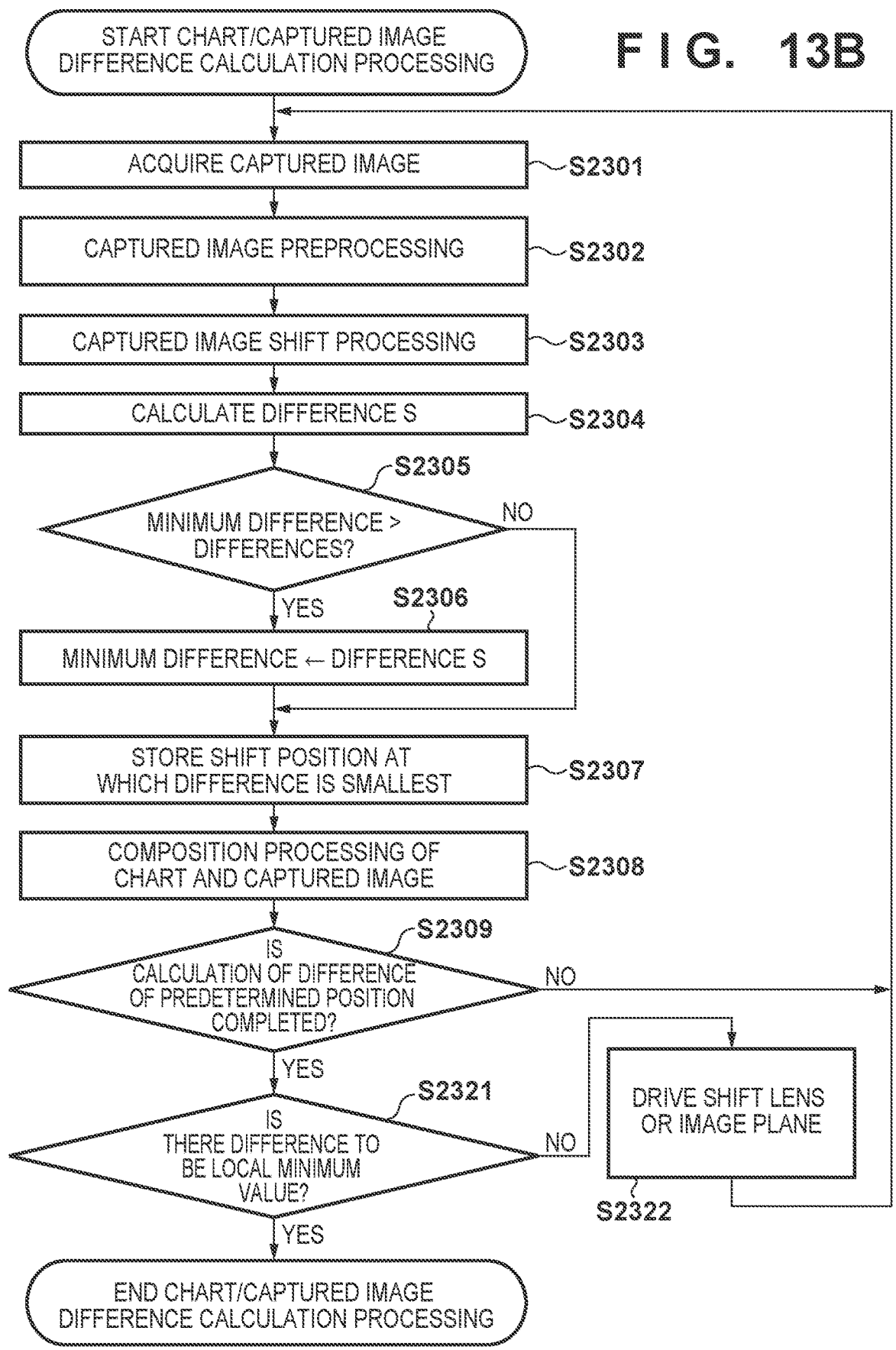
FIG. 13B is a flowchart showing processing for calculating the difference between a chart and a captured image in a fourth embodiment.

The above-described determination is performed in step S2321 of FIG. 13B, and, in step S2322, the position is fixed by driving either the image stabilization lens 114 or the image sensor 131, according to the pattern described above. Thereafter, the processing is returned to step S2301 and the shift position at which the difference is smallest is calculated again.

Note that, in the case where shift processing by image movement is performed in the captured image shift processing, the search range may be further expanded by driving both the image stabilization lens 114 and the image sensor 131.

With the above method, even in the case where the positions of the camera 100 and the chart 2500 for use in calibration are greatly out of alignment, it becomes possible to calculate and present the direction in which and by how much the camera 100 should be moved, enabling the workload of the user in angle-of-view alignment to be reduced.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-007275, which was filed on Jan. 20, 2022 and which is hereby incorporated by reference herein in its entirety.

What is claimed is:

1. An information processing apparatus comprising:
   at least one memory; and
   at least one processor, wherein the at least one processor and the at least one memory are configured to:
   acquire a captured image obtained by capturing an image of a chart for calibration;
   acquire a reference image which is an image of the chart that serves as a reference;
   acquire information on distortion aberration of a lens used to capture the captured image;
   generate a pseudo image which is an image obtained by reflecting the distortion aberration in the reference image, based on the reference image and the information on distortion aberration;
   generate a composite image obtained by compositing the captured image and the pseudo image;
   calculate a degree of deviation of an image based on the captured image and the pseudo image, and further calculate an evaluation value based on the degree of deviation;
   generate an indicator for moving an image capturing apparatus to which the lens is mounted, based on the evaluation value; and
   limit a range for calculating the degree of deviation in the captured image and the pseudo image, according to an amount of distortion aberration of the lens or an image height of the captured image.

2. The information processing apparatus according to claim 1, wherein the at least one processor and the at least one memory are further configured to:
   output the composite image to a display device.

3. The information processing apparatus according to claim 2, further comprising the display device.

4. The information processing apparatus according to claim 1,
   wherein the information on distortion aberration includes at least one of information relating to distortion aberration estimated from the captured image and the reference image, information relating to distortion aberration stored in the lens, and information relating to distortion aberration stored in an image capturing apparatus to which the lens is mounted.

5. The information processing apparatus according to claim 1,
   wherein the at least one processor and the at least one memory are further configured to enlarge or reduce the reference image, according to a focal length of the lens.

6. The information processing apparatus according to claim 1,
   wherein the degree of deviation includes at least one of a vector indicating distance and direction of a feature point of the captured image and a corresponding feature point of the pseudo image, and a vector indicating distance and direction of a center of gravity point of a specific region of the captured image and a center of gravity point of a corresponding specific region of the pseudo image.

7. The information processing apparatus according to claim 1,
wherein the at least one processor and the at least one memory are further configured to change a color or a form of part of the pseudo image that is composited with the captured image, according to the degree of deviation.

8. The information processing apparatus according to claim 1, further comprising:
a storage device configured to store information on the lens, information on the distortion aberration of the lens, the degree of deviation and the evaluation value in association with the captured image.

9. The information processing apparatus according to claim 1, wherein the at least one processor and the at least one memory are further configured to:
perform control to automatically capture an image if the evaluation value satisfies a predetermined condition.

10. The information processing apparatus according to claim 1, wherein the at least one processor and the at least one memory are further configured to:
generate information of the chart, wherein the information of the chart is generated by detecting information necessary for generating information of the chart from the captured image.

11. The information processing apparatus according to claim 1, wherein the at least one processor and the at least one memory are further configured to:
calculate a difference between the captured image and the pseudo image; and
in a case where the difference between the captured image and the pseudo image is greater than or equal to a predetermined value, perform control to display a movement amount of an image capturing apparatus to which the lens is mounted on a display device, and, in a case where the difference is smaller than the predetermined value, cause a shift mechanism to perform a shift operation for shifting the captured image and the pseudo image relative to each other so as to reduce the difference.

12. The information processing apparatus according to claim 11,
wherein the shift mechanism includes at least one of a mechanism configured to perform the shift operation by driving an image stabilization lens provided in the lens and a mechanism configured to perform the shift operation by driving an image sensor that captures the captured image.

13. The information processing apparatus according to claim 12,
wherein, in the case where the shift operation is performed by driving the image stabilization lens or in the case where the shift operation is performed by driving the image sensor, the at least one processor and the at least one memory are further configured to perform control such that the composite image is generated based on the captured image that is prior to the shift operation being performed.

14. The information processing apparatus according to claim 11, wherein the at least one processor and the at least one memory are further configured to calculate a relative rotational amount of the captured image and the pseudo image.

15. An image capturing apparatus comprising:
the lens;
an image sensor for capturing the captured image; and
the information processing apparatus according to claim 1.

16. An information processing method comprising:
executing first acquisition for acquiring a captured image obtained by capturing an image of a chart for calibration;
executing second acquisition for acquiring a reference image which is an image of the chart that serves as a reference;
executing third acquisition for acquiring information on distortion aberration of a lens used to capture the captured image;
executing first generation for generating a pseudo image which is an image obtained by reflecting the distortion aberration in the reference image, based on the reference image and the information on distortion aberration; and
executing second generation for generating a composite image obtained by compositing the captured image and the pseudo image;
executing calculation for calculating a degree of deviation of an image based on the captured image and the pseudo image, and further calculating an evaluation value based on the degree of deviation;
executing generation for generating an indicator for moving an image capturing apparatus to which the lens is mounted, based on the evaluation value; and
executing limitation for limiting a range for calculating the degree of deviation in the captured image and the pseudo image, according to an amount of distortion aberration of the lens or an image height of the captured image.

17. A non-transitory computer-readable storage medium storing computer-executable instructions for causing a computer to execute an information processing method, the information processing method comprising:
executing first acquisition for acquiring a captured image obtained by capturing an image of a chart for calibration;
executing second acquisition for acquiring a reference image which is an image of the chart that serves as a reference;
executing third acquisition for acquiring information on distortion aberration of a lens used to capture the captured image;
executing first generation for generating a pseudo image which is an image obtained by reflecting the distortion aberration in the reference image, based on the reference image and the information on distortion aberration; and
executing second generation for generating a composite image obtained by compositing the captured image and the pseudo image;
executing calculation for calculating a degree of deviation of an image based on the captured image and the pseudo image, and further calculating an evaluation value based on the degree of deviation;
executing generation for generating an indicator for moving an image capturing apparatus to which the lens is mounted, based on the evaluation value; and executing limitation for limiting a range for calculating the degree of deviation in the captured image and the pseudo image, according to an amount of distortion aberration of the lens or an image height of the captured image.

* * * * *